(12) United States Patent
Chesla

(10) Patent No.: US 7,617,170 B2
(45) Date of Patent: Nov. 10, 2009

(54) GENERATED ANOMALY PATTERN FOR HTTP FLOOD PROTECTION

(75) Inventor: Avi Chesla, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 99 days.

(21) Appl. No.: 11/869,733

(22) Filed: Oct. 9, 2007

(65) Prior Publication Data

US 2008/0086434 A1   Apr. 10, 2008

Related U.S. Application Data

(60) Provisional application No. 60/828,771, filed on Oct. 9, 2006.

(51) Int. Cl.
   *G06N 5/02* (2006.01)
   *G06F 15/18* (2006.01)

(52) U.S. Cl. ......................................................... 706/46

(58) Field of Classification Search ........................ None
   See application file for complete search history.

(56) References Cited

U.S. PATENT DOCUMENTS

2003/0065943 A1*  4/2003  Geis et al. .................... 713/201
2006/0095569 A1*  5/2006  O'Sullivan .................. 709/224
2007/0214505 A1*  9/2007  Stavrou et al. ................. 726/24

OTHER PUBLICATIONS

A Multilayer Approach of Anomaly Detection for Email Systems, Ye Wang; Abdel-Wahab, H.; Computers and Communications, 2006. ISCC '06. Proceedings. 11th IEEE Symposium on , Jun. 26-29, 2006 pp. 48-53, Digital Object Identifier 10.1109/ISCC.2006.10.*
A hybrid intelligent intrusion detection system to recognize novel attacks, Dwen-Ren Tsai; Wen-Pin Tai; Chi-Fang Chang; Security Technology, 2003. Proceedings. IEEE 37th Annual 2003 International Carnahan Conference on Oct. 14-16, 2003 pp. 428-434, Digital Object Identifier 10.1109/CCST.2003.1297598.*

* cited by examiner

*Primary Examiner*—David R Vincent
*Assistant Examiner*—Ola Olude-Afolabi
(74) *Attorney, Agent, or Firm*—Myers Wolin, LLC

(57) ABSTRACT

A system and method to detect and mitigate denial of service and distributed denial of service HTTP "page" flood attacks. Detection of attack/anomaly is made according to multiple traffic parameters including rate-based and rate-invariant parameters in both traffic directions. Prevention is done according to HTTP traffic parameters that are analyzed once a traffic anomaly is detected. This protection includes a differential adaptive mechanism that tunes the sensitivity of the anomaly detection engine. The decision engine is based on a combination between fuzzy logic inference systems and statistical thresholds. A "trap buffer" characterizes the attack to allow an accurate mitigation according to the source IP(s) and the HTTP request URL's that are used as part of the attack. Mitigation is controlled through a feedback mechanism that tunes the level of rate limit factors that are needed in order to mitigate the attack effectively while letting legitimate traffic to pass.

14 Claims, 26 Drawing Sheets

| Hour | 1st week | | | | 2nd week | | | | | | | | 3rd week |
|---|---|---|---|---|---|---|---|---|---|---|---|---|---|
| | Mo | Tu | ... | Hour in a week average | Mo | | Tu | | ... | | Hour in a week averages | | |
| 7:00 – 8:00 | $Y_{11}$ | $Y_{12}$ | $Y_{1n}$ | $\hat{Y}_{1,N}$ | $Y_{11}$ | $\hat{Y}_{11}$ | $Y_{12}$ | $\hat{Y}_{12}$ | $Y_{1n}$ | $\hat{Y}_{1n}$ | $\hat{Y}_{1,N}$ | $\hat{\hat{Y}}_{1,N}$ | |
| 8:00 – 9:00 | $Y_{21}$ | $Y_{22}$ | $Y_{2n}$ | $\hat{Y}_{2,N}$ | $Y_{21}$ | $\hat{Y}_{21}$ | $Y_{22}$ | $\hat{Y}_{22}$ | $Y_{2n}$ | $\hat{Y}_{2n}$ | $\hat{Y}_{2,N}$ | $\hat{\hat{Y}}_{2,N}$ | |
| 9:00 – 10:00 | $Y_{31}$ | $Y_{32}$ | $Y_{3n}$ | $\hat{Y}_{3,N}$ | $Y_{31}$ | $\hat{Y}_{31}$ | $Y_{32}$ | $\hat{Y}_{32}$ | $Y_{3n}$ | $\hat{Y}_{3n}$ | $\hat{Y}_{3,N}$ | $\hat{\hat{Y}}_{3,N}$ | |
| 10:00 – 11:00 | $Y_{41}$ | $Y_{42}$ | $Y_{4n}$ | $\hat{Y}_{4,N}$ | $Y_{41}$ | $\hat{Y}_{41}$ | $Y_{42}$ | $\hat{Y}_{42}$ | $Y_{4n}$ | $\hat{Y}_{4n}$ | $\hat{Y}_{4,N}$ | $\hat{\hat{Y}}_{4,N}$ | |
| 11:00 – 12:00 | $Y_{51}$ | $Y_{52}$ | $Y_{5n}$ | $\hat{Y}_{5,N}$ | $Y_{51}$ | $\hat{Y}_{51}$ | $Y_{52}$ | $\hat{Y}_{52}$ | $Y_{5n}$ | $\hat{Y}_{5n}$ | $\hat{Y}_{5,N}$ | $\hat{\hat{Y}}_{5,N}$ | |
| 12:00 – 13:00 | $Y_{61}$ | $Y_{62}$ | $Y_{6n}$ | $\hat{Y}_{6,N}$ | $Y_{61}$ | $\hat{Y}_{61}$ | $Y_{62}$ | $\hat{Y}_{62}$ | $Y_{6n}$ | $\hat{Y}_{6n}$ | $\hat{Y}_{6,N}$ | $\hat{\hat{Y}}_{6,N}$ | |
| ⋮ | $Y_{m1}$ | $Y_{m2}$ | $Y_{mn}$ | $\hat{Y}_{m,N}$ | $Y_{m1}$ | $\hat{Y}_{m1}$ | $Y_{m2}$ | $\hat{Y}_{m2}$ | $Y_{mn}$ | $\hat{Y}_{mn}$ | $\hat{Y}_{m,N}$ | $\hat{\hat{Y}}_{m,N}$ | |
| Day average | $\hat{Y}_{M,1}$ | $\hat{Y}_{M,2}$ | $\hat{Y}_{M,n}$ | | $\hat{Y}_{M,1}$ | $\hat{\hat{Y}}_{M,1}$ | $\hat{Y}_{M,2}$ | $\hat{\hat{Y}}_{M,2}$ | $\hat{Y}_{M,n}$ | $\hat{\hat{Y}}_{M,n}$ | | | |

FIG. 6

GENERATED ANOMALY PATTERN FOR HTTP FLOOD PROTECTION

RELATED APPLICATIONS

This application claims priority to U.S. Provisional Application 60/828,771 filed Oct. 9, 2006, which is incorporated herein by reference.

BACKGROUND OF THE INVENTION

1. Field of Invention

The present invention relates generally to the field of computer security. More specifically, the present invention is related to a system and method providing adaptive behavioral HTTP protection against HTTP floods attacks that misuse the resources of Web servers.

2. Discussion of Prior Art

Applicant's pending application titled "Dynamic Network Protection" teaches a method for protecting a network from an attack wherein the method involves measuring a property of traffic entering a network, analyzing the property of traffic entering the network, and analyzing the property using at least one fuzzy logic algorithm in order to detect the attack.

Whatever the precise merits, features, and advantages of the prior art is, none of them achieves or fulfills the purposes of the present invention.

SUMMARY OF THE INVENTION

The present invention provides for a system and method to detect and mitigate, both distributed and single source IP, HTTP page flood attacks (i.e., HTTP requests floods such as HTTP GET, POST, HEAD etc) that are typically generated by HTTP bots. The present invention's approach is a novel server-based protection which means that all statistics are collected per protected server object. Detection of attack/anomaly is made according to multiple HTTP traffic characteristics including rate-based and rate-invariant parameters in both traffic directions. Prevention is done according to more in-depth HTTP traffic parameters that are analyzed once traffic anomaly is detected. This protection system is based on anomaly detection engine that checks correspondence of current (real-time) traffic parameters to its history learned in regular (non-attack) system state. This protection system includes an adaptive mechanism that tunes the sensitivity of the anomaly detection (or decision) engine according to the adapted normal traffic behavior. The decision engine is based on a combination between fuzzy logic inference systems and statistical thresholds. A "trap buffers" mechanism is responsible for characterizing the attack in a way that allows an accurate mitigation according to the source IP address(es) of the attack and the HTTP requests that are used as part of the attack.

The present invention provides for a server-based architecture providing HTTP flood protection comprising: a statistics module computing a plurality of real-time statistical parameters, said plurality of real-time statistical parameters comprising at least one rate-based parameter or at least one rate-invariant parameter and one rate-based parameter; a learning module computing normal base line values; an anomaly detection engine comprising an embedded correlation rules and a degree of anomaly generator generating a degree of anomaly (DoA) based on said received plurality of real-time statistical parameters and said plurality of normal base line values; at least one source IP trap buffer, said at least one source IP trap buffer detecting abnormal repetitions (frequency) of HTTP request URI's per source IP address and protected Web server; and at least one HTTP request size trap buffer, said at least one HTTP request trap buffer detecting abnormal repetitions (frequency) of HTTP request URI's per protected Web server only (i.e., without source IP addresses), wherein the generated degree of anomaly indicates a HTTP flood attack, and the decision engine communicates with said source IP trap buffer and the HTTP request size trap buffer to characterize the anomaly. The HTTP request size trap buffer is used for the case in which the attack is distributed among many source IP addresses (e.g., more than 1000). In such a case it will not be possible to analyze the traffic according to source IP address (for memory and CPU resources scalability reasons). Therefore only HTTP request URI will be characterized.

The present invention also provides for an anomaly detection engine comprising: an interface to receive at least the following: a plurality of real-time statistical parameters or a plurality of normal base line values, said plurality of real-time statistical parameters comprising at least one rate-based parameter or at least one rate-invariant parameter and one rate-based parameter; embedded correlation rules; a degree of anomaly generator generating a degree of anomaly (DoA) based on said received plurality of real-time statistical parameters and said plurality of normal base line values; and when said generated degree of anomaly indicates a HTTP flood attack, said decision engine communicates with at least one buffer to characterize the anomaly.

In one embodiment, the normal base line values are generated by a learning mechanism comprising of any of the following: day-time differential averaging or continuous IIR filtering/continuous averaging. It should be noted that the protection system learns according to both learning strategies. The anomaly detection engine uses only one of them according to manual configuration or automatically through an automatic learning strategy characterization mechanism.

In one embodiment, the normal base line values are dynamically updated over a predetermined time period so that said anomaly detection engine tunes its detection sensitivity based on said updated normal base line values.

In one embodiment, the learning mechanism is dynamically picked from said day-time differential averaging or said continuous IIR filtering/continuous averaging based on a behavior of a network protected environment. It should be noted that the anomaly detection engine always starts (tuned) with the continuous averaging baselines and after a few weeks a decision if to move into differential method or not (which requires more statistical data), is taken place.

In one embodiment, the anomaly detection engine is implemented in server accessible over a network, wherein the network is any of, or a combination of, the following: a local area network, a wide area network, the Internet, or a cellular network. In one specific embodiment, the network is the Internet and the server is a web server and the network attack is a HTTP flood attack.

The real-time statistical HTTP parameters are divided into two groups: rate-based parameters and rate-invariant parameter. Rate-based parameters are any (but should not be limited to) of, or a combination of, the following: number of HTTP requests per second, HTTP outbound bandwidth in a time interval and number of HTTP requests per second per source IP address. Rate-invariant parameters are any (but should not be limited to) of, ratio between HTTP request to outbound HTTP bandwidth in a time interval, HTTP request (URL) size distribution, number of HTTP request per TCP connection.

The base line parameters are statistical aggregations of any of real-time statistical parameters (rate-based or rate-invariant). Continues Learning forms its base line by means of aggregation according to a moving time window and, Differential Learning forms Weekly Periodical Base Line that aggregates real-time values according to specific day time and day in week (it involves both direct 24×7 histogram approach and Fourier series approach).

The trap buffers (source and size types) are created according to suspicious lists. There are two lists: source IP list and size list—The first one includes all suspicious source IP addresses (these addresses are determined according to rate parameters as specified below, the second list includes all suspicious HTTP request URL sizes that are determined according to the normal URL size distribution as specified below.

Each list is divided into two sub-lists (high suspicious list and low suspicious list). Inclusion at each list is determined according to suspicious and attack thresholds (i.e., LOW=lower than attack thresholds and higher than suspicious threshold. High=higher than attack threshold).

In one embodiment, the buffer further comprises: at least one source IP trap buffer, said at least one source IP trap buffer storing a first list of at least one source IP address that was identified based on an abnormal rate of HTTP requests per source IP or based on the abnormal number of HTTP requests per TCP connection that was generated by said at least one source IP address; and at least one HTTP request size trap buffer, said at least one HTTP request trap buffer storing a second list of at least one suspicious HTTP request size deviating from an adapted size distribution base line.

In an extended embodiment, the first list further comprises: a first sub-list storing highly suspicious sources determined based on a frequency of suspicious occurrences greater than a threshold; and a second sub-list of storing low suspicious sources determined based on a frequency of suspicious occurrences lower than said threshold.

In one embodiment, the list further comprises: a first sub-list storing highly suspicious HTTP request sizes determined based on a suspicious HTTP request size greater than a threshold; and a second sub-list storing lower suspicious HTTP request sizes determined based on a suspicious HTTP request size lower than a threshold.

After this stage the system analyze the suspicious traffic through the source IP or size trap buffers. The source trap buffers (the system preferable option) analyze all HTTP traffic that the suspicious sources (from the suspicious source list) generate toward the protected server and the size trap buffer analyze all HTTP requests that match the sizes that exist in the suspicious size list. Both trap buffer types aim to find specific URLs that are "intensively" repeated in an abnormal frequency (the source trap buffer is able to associate the source IP address to these URLs and the size trap buffer will not).

The rate-based parameter is any of (but should not be limited to) the following: a get request per second counter—Get_C, which is incremented by one upon classification of any HTTP Get request toward a protected server; a post request per second counter—Post_C, which is incremented by one upon classification of any HTTP Post request toward a protected server; an other request per second counter—Other_C, which is incremented by one upon classification of any HTTP request type that is not Get or Post toward a protected server; an outbound bandwidth per second counter—OutB_C, which measures the outbound HTTP traffic that is generated by a protected server; and a source HTTP request per second counter—S_R_C, which is attached to each source IP address that "owns" a HTTP session toward a protected server and wherein the S_R_C counter is incremented by one upon classification of any HTTP Get or Post request toward a protected server.

The one rate-invariant parameter is any of (but should not be limited to) the following: a HTTP request per connection counter—Con_R_C, which is maintained per TCP connection and wherein the Con_R_C counter is incremented upon classification of any HTTP Get or Post request toward a protected server; a ratio between outbound bandwidth to HTTP requests—Out/R_P, which measures an average outbound bandwidth per inbound HTTP Get or Post requests; and a HTTP request short-term size distribution table—S_D_T, which measures the current size distribution of HTTP request URL's, and upon classification of a HTTP Get or Post requests, the HTTP Get or Post request size is being indexed.

In one embodiment, the Out/R_P parameter is calculated as ratio between OutB_C and R_C where, OutB_C=outbound bandwidth and R_C=Get_C+Post_C.

In one embodiment, the HTTP request size index in said S_D_T is calculated as follows: Request Size Index=INT (Request Size/10), where said Request Size measures the length in bytes of a request-URL path. In an extended embodiment, the measure of deviation from expected Request Size is set over a predetermined time period.

In one embodiment, the learning mechanism maintains a long-term size distribution table—L_D_T, wherein a measure of deviation from expected request size occurrences is set over a predetermined time period.

In one embodiment, a set of expected values E(i) in calculated from said L_D_T as follows: $E(i)=P(i) \times R\_C_n$, where $R\_C_n$ is the total number of HTTP request (Post and Get) in one second n and P(i) is the observed frequency of each URL size grade (size grade i) according to L_D_T. In an extended embodiment, in order to save computational resources, the normal, suspect and attack edges matrix may be calculated in advance for a few $R\_C_n$ cases. The normal, suspect and attacks edges are set as follows:

Normal edge: $N(i)=E(i)$,

Attack edge: $A(i)=\sqrt{l \times [E(i) \times (E(i) + \sqrt{E(i)} \times P)]}$, Suspect edge: $S(i)=\sqrt{A \times N}$, where P is a confidence level, l is a configurable detection sensitivity level, and N is the number of entries in said L_D_T.

In an extended embodiment, in order to save computational resources, the normal, suspect and attack edges matrix may be calculated in advance for a few $R\_C_n$ cases The system analyses the suspicious sources and sizes (through the trap buffers) and generate mitigation patterns, i.e., blocking rules that include: a. source IP address(es) and one or more HTTP request URL checksums associated to them, or b. just HTTP request URL checksums (in case that the size trap buffers were chosen to characterize the detected anomaly). After the characterization stage the system starts to mitigate the attack.

In one embodiment, after said characterization of anomaly, any of the following mitigation mechanisms are implemented: rate limit traffic flows which are defined by Source IP(s) and HTTP request URL's checksum (the checksum value represents URL that was found in the characterization state) towards a protected server; rate limit traffic flows which are defined by HTTP request URL checksum(s) toward a protected server; and blocking source IP(s) toward a protected server. In an extended embodiment, the mitigation mechanisms are activated according to any of the following types of feedback: a DoA that is generated according to all inbound traffic parameters prior to mitigation and a DoA that is generated according to remaining traffic after mitigation.

BRIEF DESCRIPTION OF THE DRAWINGS

FIG. 6 describes the way that 24×7 differential average values are stored and manipulated (not all parameters are specified in below the diagram).

DESCRIPTION OF THE PREFERRED EMBODIMENTS

Figure 1:
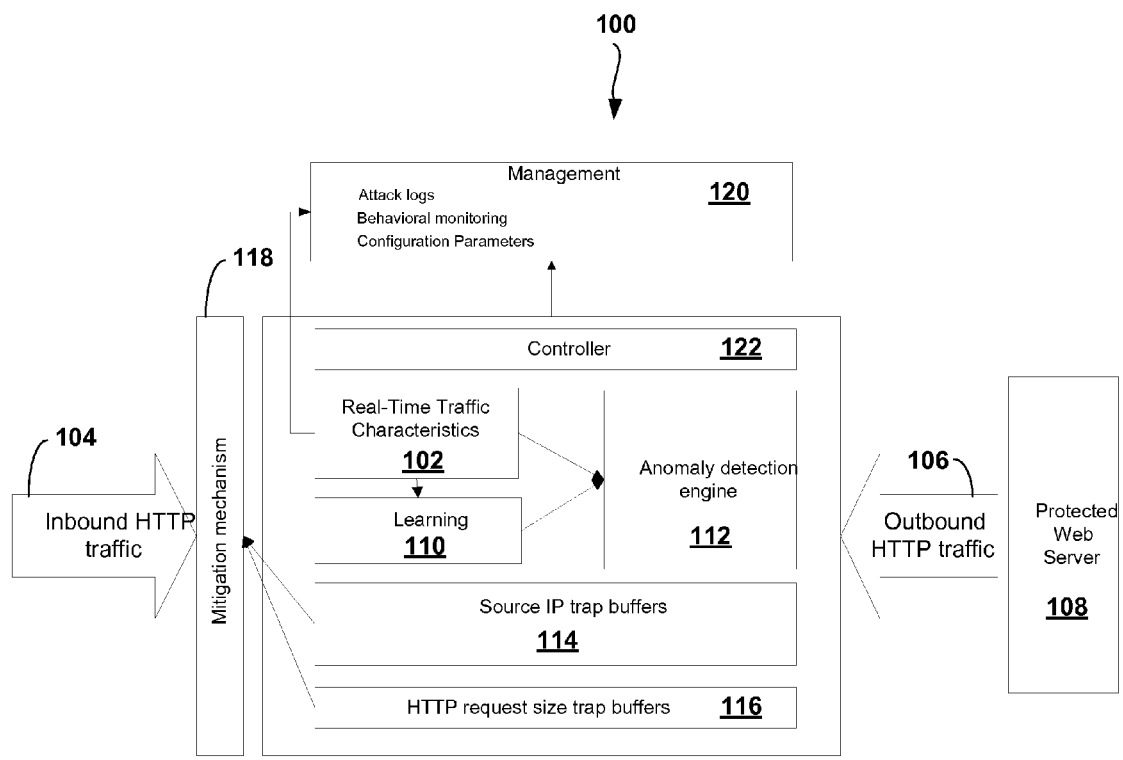
FIG. 1 illustrates the present invention's protection system architecture for HTTP flood protection.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention provides for a system and method to detect and mitigate denial of service and distributed DoS HTTP page flood attacks that can be generated, for example, by HTTP bots. The present invention's approach is a novel server-based protection which means that all statistics are collected per protected server object. Attack mitigation is made per protected server as well.

Detection of attack/anomaly is made according to multiple traffic parameters including rate-based and rate-invariant parameters in both traffic directions. Prevention is done according to more in-depth HTTP traffic parameters that are analyzed once traffic anomaly is detected.

This protection includes a differential (different learning means that the statistics are collected and learned per hour and day in a week) and continuous adaptive mechanisms that tune the sensitivity of the anomaly detection engine. The decision engine is based on a combination between fuzzy logic inference systems and statistical thresholds. "Trap buffers" mechanism is responsible to characterize the attack in a way that allows an accurate mitigation according to the source IP(s) of the attack and the HTTP request URL's that are used as part of the attack.

HTTP Flood Scenarios

Possible Attack Scenarios

The HTTP flood protection aims to cover a few possible attack scenarios against web servers. All attack scenarios share similar characteristic which include a repeated sequence of HTTP request URL's.

These scenarios include:

a. Attack that uses a repeated HTTP request pattern from the same source address b. Attack that uses a repeated HTTP request pattern in the same TCP connection c. Scenarios a or/and b that are generated from multiple source IP addresses. In this case, it is assumed that the number of source IP addresses that participate in these attacks is in the scale of thousands.

d. Scenarios a or/and b that are generated from "infinite" source IP addresses. In this case, mitigation is based only on the HTTP request that take part in the attack and not the source IP addresses.

Logical Architecture

FIG. 1 illustrates the present invention's protection system architecture 100 for HTTP flood protection.

Statistics (Real-Time Traffic Characteristics) 102

Real-Time Traffic characteristics 102 includes the classification of both inbound 104 and outbound 106 HTTP traffic coming to and from the protected web server 108. Statistical parameters include both rate-based and rate-invariant parameters (all per protected server).

The following parameters are used to detect HTTP flood attacks:

a. Number of HTTP requests per second b. HTTP outbound traffic rate c. Ratio between HTTP request to outbound HTTP traffic rate per sec d. HTTP request URL size distribution e. Number of HTTP request per TCP connection f. Number of HTTP requests per second per source IP These statistics are sent every one-second to both learning mechanism 110 and to the anomaly detection engine 112.

The aforementioned decision parameters will be further specified later in the statistics section.

Learning Mechanism—110

Learning mechanism 110 collects and aggregates the real time traffic characteristics through averaging, max, percentile procedure functions and stores the aggregated values (defined as "normal base lines"). Two learning strategies are included in this protection system:

Day-Time Differential Averaging (24×7 statistics) that groups data for aggregation according to 168 possible hours in week.

Continuous—Continuous moving window aggregation that groups data in recent history interval based on IIR filtering averaging.

Both strategies are applied separately to each kind of statistical parameter. Choice of the proper learning strategy depends on system history and its dynamics, i.e., stabile systems having quite long history are likely to exploit the first strategy if it fits the traffic "behavior" toward the protected server; otherwise, the second one is preferable.

The present invention's system starts to learn the traffic trough continuous IIR filtering; however, it has the capability to automatically choose which strategy is best according to the behavior of the protected network environment (i.e., protected servers). This decision process can take 4 or more weeks.

Periodically (typically every one hour), the learning mechanism 110 updates the anomaly detection engine 112 with the associated normal base lines. In return, the detection engine 112 tunes its detection sensitivity.

Anomaly Detection Engine—112

Anomaly detection engine 112 gets every one-second all RT (real-time) statistics parameters. An embedded correlation rules are applied and a degree of anomaly (DoA) is generated.

According to the degree of anomaly, the present invention's system decides if an anomaly, that might reflect HTTP flood attack, exists or not.

When a decision about an anomaly is made, the system stops (freezes) all learning processes and starts a process which is responsible to characterize the anomaly. The attack characterization process is conducted by the source IP "trap buffers" 114 and HTTP request size "trap buffers" 116.

The type of characterization process is selected and initiated according to the type of anomaly that is detected (e.g., request size distribution was violated or not, max number of HTTP requests per source IP address was violated or not etc). The selection process is described later on.

Source IP Trap-Buffers—114

Source IP trap buffers 114 are responsible for detecting "abnormal" repeated HTTP request (URL's) pattern or a sequence of repeated patterns that are generated by any source IP address toward the protected server 108. Source trap-buffers 114 are allocated according to the source IP addresses that are specified in the source IP addresses "suspicious list".

Suspicious (i.e., abnormal high frequency) HTTP request URL patterns, together with their associated source IP addresses, are detected and then inserted into an "action filter list". There are two sub lists, one which represent highly suspicious sources (the high source group) and their associated HTTP requests, and another that includes less suspicious sources (low source group). Later on, during the mitigation process, these two groups enable a gradual rate-limit process.

The idea behind source trap-buffers 114 is that a legitimate source IP address (although the system thought to be suspicious) will not be detected as an attacker i.e., abnormal HTTP request URL patterns will not be identified.

Source IP trap-buffers 114 are extracted from a global pool but are used specifically for each protected server 108.

Size Trap-buffers 116

In cases that an anomaly is detected but there is no suspicious IP addresses (or too many source IP addresses exist), then the size trap-buffers are activated to analyze suspicious HTTP request sizes (suspicious sizes are taken from the suspicious size list). Suspicious refers to sizes that deviate from the adapted URL size distribution base line.

These trap buffers 116 aim to detect abnormal repetition frequency of HTTP request URL's per suspicious HTTP request size. The detected HTTP request URL's are inserted into an action filter list that is used later on to mitigate the attack. As in the case of source trap-buffer, there are two sub-lists: High size group and Low size group.

Mitigation Mechanisms—118

Mitigation 118 includes a few mechanisms. One mitigation mechanism is an HTTP request rate-limit mechanism that limits the number of HTTP request in a gradual manner according to a closed-feedback mechanism. Rate-limit is applied and, if it is not sufficient enough to mitigate the attack, then a more "aggressive" rate limit factor is applied.

The idea is not necessarily to block all packets that participate in the HTTP flood but rather to mitigate it to a level in which the protected web server isn't in a denial of service risk.

These mitigation mechanisms are activated per one or multiple source IP addresses associated with the detected HTTP request URL's or per HTTP request URL's only. In extreme cases (which will be explained later on) mitigation is activated on all traffic directed to the protected server 108.

The decision about switching between the different mitigation mechanisms is done according to the type of detected anomaly and the closed-feedback mechanism.

Controller—122

Controller 122 is responsible for the synchronization between all detection, characterization and mitigation mechanisms. Controller 122 is a finite state machine. State transitions are made according to the last state information, the DoA and state time-outs.

Management—120

Management 120 allows Configuration Logging and Monitoring state of the protection system per protected server 108. This monitoring is possible via graphic representation of all Base Line parameters and real-time traffic parameters including:

Graphical representation of the protected web server behavior includes the following details:

Learning Parameters a. Normal, max and deviation of HTTP request per second (per request method.

b. Normal, max and deviation of outbound HTTP B/W per second.

c. Normal Ratio between HTTP requests to HTTP outbound B/W per second.

d. Normal HTTP request URL size distribution.

e. Adapted max HTTP request per source per second.

f. Adapted max HTTP requests per connection

RT Parameters

The same RT parameters are presented in a GUI representation as well.

Statistics Module
    Real Time Counters
    Rate-based Parameters

The following are the real time counters that the protection system supports:

Get request per second counter—Get_C
   The Get_C counter is incremented by one upon classification of any HTTP Get or Post request toward the protected server 108.
Post request per second counter—Post_C
   The Post_C counter is incremented by one upon classification of any HTTP Post request toward the protected server 108.
Other request per second counter—Other_C
   The Other_C counter is incremented by one upon classification of any HTTP request type that is not Get or Post toward the protected server 108.
Outbound HTTP bandwidth per second counter—OutB_C [KBytes]
   The OutB_C counter measures the outbound HTTP traffic that is generated by the protected server 108.
Source http request per second—S_R_C
   A S_R_C counter is attached to each source IP address that "owns" a TCP session toward the protected Web server. The S_R_C counter is incremented by one upon classification of any HTTP Get or Post request toward the protected server. The aim is to derive the typical max value of HTTP Post or Get request per second that a source (any source IP address) sends toward the protected server.
Rate-invariant Parameters Per Protected Server:
HTTP request per connection—Con_R_C
   This Con_R_C counter is maintained per TCP connection. It is incremented upon classification of any HTTP Get or Post request toward the protected server. The behavior of the Con_R_C counter is similar to the S_R_C. However, it is not reset every one second (typically it will be reset every 10 seconds or more). The counter is removed when the TCP connection is closed (or expired).

Ratio Between Outbound HTTP Bandwidth to Inbound HTTP Requests—Out/R_P
   Out/R_P is a rate-invariant (ratio) parameter that measures the average outbound HTTP bandwidth per inbound HTTP Get or Post requests per second.
   The variation of Out/R_P parameter can be high (depending on each web application). However, during some HTTP flood attack scenarios we expect to see an abnormal ratio that enables the protection system to support a better decision making process.

It should be noted that the attack scenario that this parameter refers to doesn't necessarily exhibit a very high rate of inbound HTTP requests. For example, a relativity low rate oh HTTP requests can result with significant large amount of HTTP traffic that is sent from the Web server, thus can cause bandwidth saturation in the outbound traffic direction).
   This Out/R_P ratio parameter is calculated as follows:

$$Out/R\_P = \frac{OutB\_C}{R\_C},$$

where, OutB_C=Outbound bandwidth and, in this case, is measured in Kbytes per second and, R_C=Get_C+Post_C
   The Out/R_P ratio parameter is updated every one second.
HTTP Request Short-term Size Distribution Table—S_D_T
   The S_D_T parameter measures the size distribution of HTTP request URI's. Size quantization is 10 Bytes.

Upon classification of HTTP Get or Post requests, the request URL is indexed according to its size. The index identifies an entry in a size distribution table (short term and long term tables).
   The HTTP request size index is calculated as follow:

Request size index=Int(Request size/10)

Where, the request size measures the length (in bytes) of the request URL path.

Figure 2:
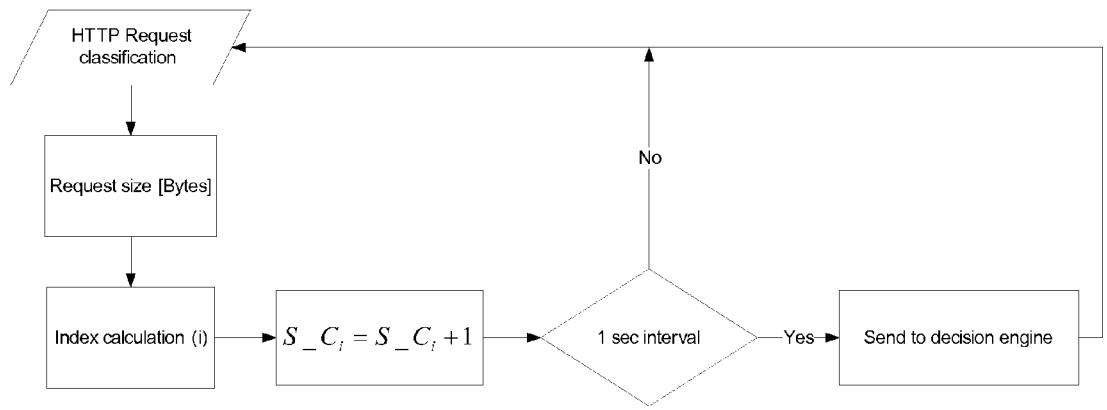
FIG. 2 illustrates a flow chart depicting how the short term size distribution table is updated.

Adaptive URL Size Quantization
   There is also an option to use a non-uniform URL size quantization that is based on decomposition of interval (0, infinity) into number of HTTP URL size bins that are expected to be equivalent (i.e., equal in terms of number of HTTP request hits that each bin is expected to be associate with). The decomposition is based on an initial, learning-only, period in which the system collects information about URL size distribution and is tuned periodically (every week) in order to be consistent with the protected server current state. Through this adaptive URL size quantization, the system can increase the accuracy of the decision making. For example, when using a uniform URL size quantization, and when the adapted probability of certain URL size is very low (e.g., P(i)=0.0001), then there is a chance that also a very low rate of HTTP requests that correspond to this URL size will look like an anomaly while it is actually a "reasonable" legitimate behavior. This case can be prevented by the adaptive size quantization option.
   FIG. 2 illustrates a flow chart depicting how the short term size distribution table is updated. It should be noted that:
      1 sec interval—The interval in which a decision is made. Can be at the range of 1 to 10 seconds.
      Two types of size distribution tables are supported: short term (for real-time anomaly detection as specified above) and long term table for learning, i.e., calculating the URL size probability.
      According to the long-term size distribution table (which is defined later on), a measure of deviation from the expected request URL size occurrences is set every one second and is sent to a decision engine.

Learning Mechanisms
   Two learning strategies are supported:
   a. Continuous learning
   b. 24×7 differential learning
   Choosing the strategy that best fits the network environment is automated through the learning mechanism itself.

Continuous Learning Averaging
   Continuous learning averaging is based on first order IIR filter. It means that every pre-defined period (typically 1 second) for learned value (lv) the recurrent equation $$lv=(1-\alpha)\cdot lv+\alpha\cdot v \text{ is applied.} \quad \text{Eq (1).}$$

Where, v is the currently observed value,
   α represents the continuous learning response. In most cases it is defined as $$\alpha = \frac{\Delta t}{T}\ln\frac{1}{\beta}$$

where T is the learning window size (e.g., day, week, month etc),
Δt is the time measurement unit,
β=0.05 (asymptotical average value after X iterations)

This approach takes into account all previous history of the learned parameter but the influence of history with delay of T is less significant This first order IIR continuous learning is applied to the following statistics counters:

Get_C, Post_C, Other_C, OutB_C, and their associated peak values.

These counters are incremented every one second. The following is an example of how the IIR filter applies to R_C parameter:

$$R\_C_n = (1-\alpha) \cdot R\_C_{n-1} + \alpha \cdot R\_C_{new}, \quad \text{Eq (2):}$$

where, R_C=Get_C+Post_C and α represents the continuous learning response. Three α values will enable day, week (default) and month learning response sensitiveness.

The following alpha values are set to the continuous average functions unless other alpha is specified:

a. Day learning sensitivity $$\alpha = \frac{\Delta t}{T} \ln \frac{1}{\beta} = \frac{1}{86400} \ln\left(\frac{1}{0.05}\right) = 3.46 \times 10^{-5},$$

b. 1 week learning sensitivity $\alpha = 4.95 \times 10^{-6}$ c. 30 days (1 month) learning sensitivity $\alpha = 1.15 \times 10^{-6}$ Peak Values In addition to the continuous average also a max (peak) parameter is calculated. The max value is evaluated according to the last hour and every one hour it goes thorough a max continuous averaging formula (below is an example for calculation of max HTTP request):

$$R\_C_n^M = \max\_(R\_C_{new}^M, \alpha \cdot R\_C_{new}^M + (1-\alpha) \cdot R\_C_{n-1}^M) \quad \text{Eq (3):}$$

It should be noted that n in equation 3 above refers to hour and not to second as in the other cases (e.g., equation 2).

Out/R_P

Average of Out/R_P will be calculated every one second as follows:

$$\text{Out/R\_P}_n = \min\left(\frac{\text{OutB\_C}_n}{\text{R\_C}_n}, 1000\right). \quad \text{Eq (4)}$$

To protect Out/R_P base line from extremely big values, this equation is restricted by 1000.

Max Con_R_C and Max S_R_C

Max S_R_C (Max HTTP request per source)

The Max S_R_C counter represents the max number of HTTP get request that are associated with any source IP address in one second.

Every one second the max value, among all counters that are associated with the protected server, is set. In case that the value is higher than the last second's Max S_R_C then a new Max value is set.

Figure 3:
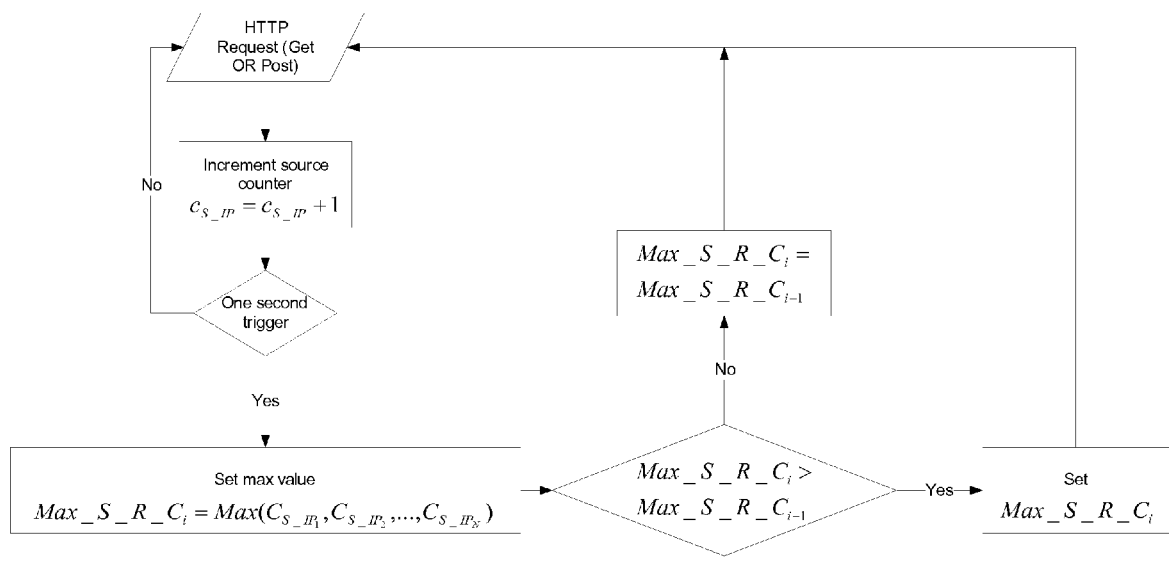
FIGS. 3 and 4 illustrate the behavior of the Max S_R_C and Max Con_R_C counters, respectively.
Figure 4:
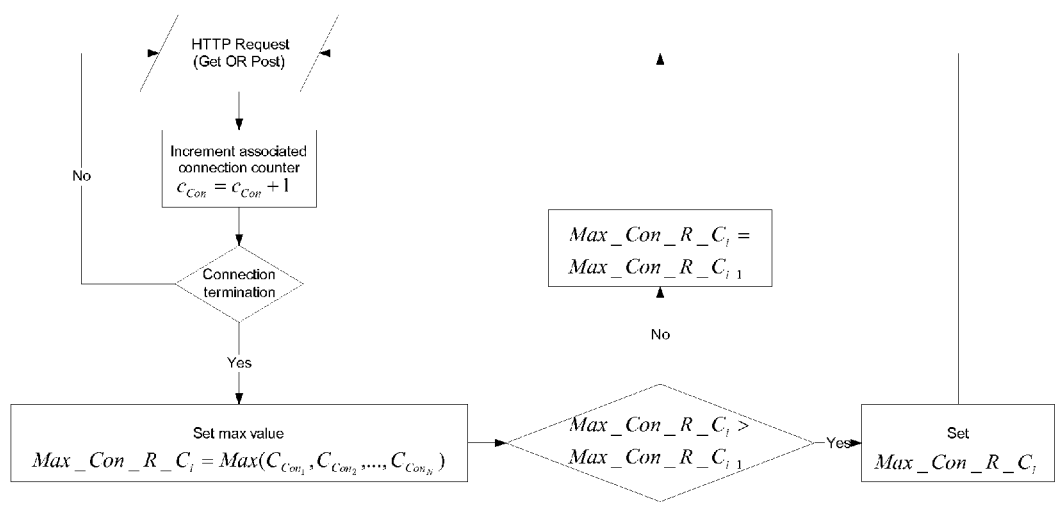

FIGS. 3 and 4 illustrate the behavior of the Max S_R_C and Max Con_R_C counters, respectively.

Fading Max Counter Behavior

In order to be responsive for a more close in time measurements, every 10 seconds the average Max_S_R_C and Max_Con_R_C are calculated as follow (below is a Max_S_R_C example):

$$\text{Max\_S\_R\_C}_n = \max\_(\text{Max\_S\_R\_C}_{new}, \alpha \cdot \text{Max\_S\_R\_C}_{n-1} + (1-\alpha) \cdot \text{Max\_S\_R\_C}_{new}) \quad \text{Eq (5):}$$

In this case alpha represents shorter learning response values such as.

a. 10 minutes $$\alpha = \frac{\Delta t}{T} \ln \frac{1}{\beta} = \frac{10}{600} \ln\left(\frac{1}{0.05}\right) = 0.0499$$

b. 30 minutes (default):

$\alpha = 0.0166$ c. 60 minutes (one hour):

$\alpha = 0.0008$ d. 1 day:

$\alpha = 3.46 \times 10^{-5}$

Long-term request size distribution table—LDT

The long term size distribution table is used to calculate the expected occurrences number (E(i)) for size grade (i).

Figure 5:
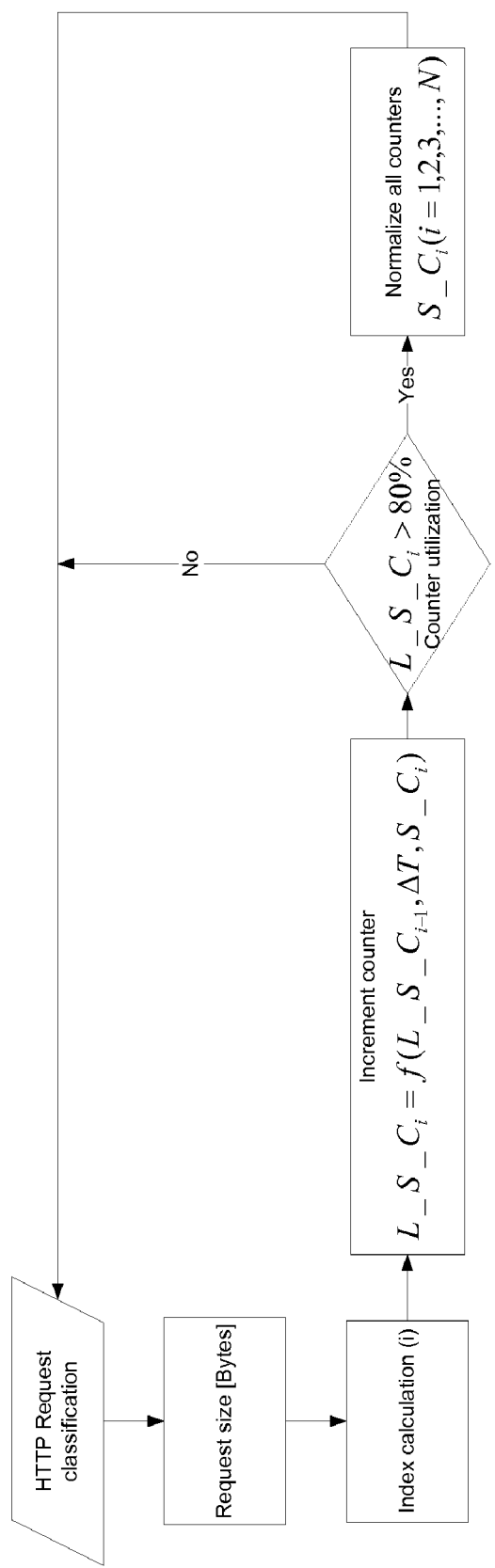
FIG. 5 illustrates the LTD table update flow.

FIG. 5 illustrates the LTD table update flow. Every one hour, a set of probabilities P(i), where i=1,2, . . . , N, is calculated. The set includes a probability for each size grade (i.e., size quantization):

$$\text{Eq (6):} \quad P(i) = \frac{L\_S\_C_i}{M},$$

Where, $$M = \sum_i L\_S\_C_i - \text{The sum of all counters}$$

$L\_S\_C_i$ is a request counter per size index (i) for long term learning.

N is the number of entries in the distribution table.

Counter's Fading Behavior

In order to be more responsive to events that are closer in time (i.e., remote in time size distribution is less relevant) and in order to avoid (not eliminate) counter's overlapping; each size counter will adapt a fading behavior. Fading will be applied according to the following formula:

$$L\_S\_C_i = \alpha \times L\_S\_C_{i-1} + S\_C_{new} \quad \text{Eq (7):}$$

Where, $S\_C_{new}$ is the number of size hits in one second (of grade i) and α is calculated this time as follow:

$$\alpha = 1 - \frac{\Delta t}{T}; \Delta t = 1 \text{ Sec.}$$

The three sensitivities are defined as follow:
- a. day: T=3600*24
- b. week: T=3600*24*7
- c. month: (30 days) T=3600*24*30

It should be noted that M, which is the sum of all counters, is calculated in the same way (i.e., sum of all fading counters).

In order to have a robust probability measure, probability calculation will take place every one hour only if M reaches a certain value (between 1000 to 10000 with a default of 5000). If not, then the hourly probability update will be skipped.

Counters Normalization

To avoid overflow in counting there is special renormalization mechanism: In case that a counter, in the LDT, reaches some limit (typically $10^9$,) all counters will be divided by some factor (typically 1000).

Continuous Normal Base Lines Summary

Continuous learning parameters table shown in Table 1 below summarizes the continuous learning section.

Initial Learning Values

Initial learning values are set according to the one of the following three options:
- a. Adaptive steps—In case of IIR filters, in the first $n^{th}$ steps (seconds) alpha are set in a way that result in linear average expression (alpha=i−1/i; if i<=n)
- b. Initial rate values are defined through configuration. Initial peak values are set as well.
- c. The system is in a learning mode for a pre-defined period or number of events. During this period there is no detection and prevention (only monitoring).

24×7 Differential Learning Averaging

In cases of stable periodic traffic behavior, a 24×7 differential learning can improve the accuracy of detection.

Differential learning keeps a set of average values for each hour in a day and day in a week. Historical information (one hour average values) of 1 week is maintained. By using IIR continuous averaging, historical information of up to 24 weeks (~6 months) can have contribution to the deferential learning base lines. In order to decide if differential learning is beneficial, i.e., fits the protected web server behavior, a convergence parameter (R) is calculated.

If this parameter comply with pre-defined conditions, the system automatically tunes the sensitivity of the anomaly detection engine according to the 24×7 differential learning base lines.

The anomaly detection engine always starts to work based on the continuous learning mechanism. Switching to 24×7 detection sensitivity is possible only after a pre-defined period (default: four weeks) and if the convergence parameter (R) meets the pre-defined conditions.

For cases in which the system has to switch back from differential detection sensitivity to continuous detection sensitivity, the continuous learning is maintained in the background.

Logical Structure of 24×7 Differential Base Lines

The following base line parameters are learned according to differential learning mechanism:
- a. R_C
- b. Other_C
- c. OutB_C The other parameters are averaged according to continues learning mechanism only.

FIG. 6 describes the way that 24×7 differential average values are stored and manipulated (not all parameters are specified in below the diagram). In FIG. 6:

1. $Y_{mn}$=Linear average of one second counter, where n (n=1,2,3, . . . N) represents day in a week and m (m=1, 2,3, . . . , M) represents hour in a day. This is a "stand alone" value that represents a certain hour in a day.
2. $\hat{Y}_{m,N}$=Linear average of hour m over one week (for future use).
3. $\hat{Y}_{M,n}$=Linear average of day n over all hours in the day (for future use).
4. $\hat{Y}_{m,n}$=Exponential average of hour m in day n over "all" weeks. This average function includes adaptive steps for the first four weeks. The average is calculated every one hour given the new linear average $Y_{mn}$ and last average $\hat{Y}_{m,n}^{old}$ so, $$\hat{Y}_{m,n} = \alpha \times Y_{mn} + (1-\alpha) \times \hat{Y}_{mn}^{old} \qquad \text{Eq (8)}$$

5. $\hat{Y}_{M,n}$=Exponential average of day n over "all" past weeks. This average function includes adaptive steps for the first four weeks (for future use).
6. $\hat{Y}_{m,N}$=Exponential average of hour m over "all" past weeks. This average function includes adaptive steps for the first four weeks (for future use).

24×7 learning response values are set as follows:
a. 4 weeks (special case for "big" alpha values):

$$\alpha = 1 - \beta^{\frac{\Delta t}{T}}; = 1 - 0.05^{\frac{1}{4}} = 0.52$$

where, $\beta$=0.05 (asymptotical value after X iterations)

b. 12 weeks (~3 months—special case for "big" alpha values):

$$\alpha = 1 - \beta^{\frac{\Delta t}{T}}; = 1 - 0.05^{\frac{1}{12}} = 0.22$$

c. 24 weeks (~6 months):

$$\alpha = \frac{\Delta t}{T} \ln\frac{1}{\beta} = \frac{1}{24} \ln\left(\frac{1}{0.05}\right) = 0.125$$

Parameters that are not specified in FIG. 6 above include:
1. $Y_{m,n}^M$=Max value (peak) of events for each hour m in day n. This counter will follow the same max continuous averaging formula as was specified in (Eq 5). The max average will be $\hat{Y}_{m,n}^M$.
2. R—Periodic stability measure set of parameters. R is calculated according to the information of the last 4 weeks and is a measure of "stability" of series $Y_{m,n}^i$, where i represents a week number (i=1, . . . 4) and the combination of m, n represents hour m in a day n.

So, $$R_{mn} = \sum_{i=1}^{3} \frac{|Y_{mn}^i - Y_{mn}^{i-1}|}{\min(Y_{mn}^i, Y_{mn}^{i-1})}. \qquad \text{Eq (9).}$$

The above equation represents the "stability" parameter for each hour m in a day n. The stability condition is defined as $R_{mn} \leq 1$. In case all series (i.e., all hours) comply with this condition over the last 4 weeks, then 24×7 differential learning sensitivity is applied. Condition flow is defined in FIG. 7.

It should be noted that:
Initial max/peak values definitions are part of the initial learning value options (see above).

There is an option to add "sub" convergence parameters that will measure the stability of one day over weeks and one hour over a few days and weeks and use it in order to update the normal baselines in a more "customized" manner, e.g., normal base line per hour or day throughout all weeks.

An option to apply additional analysis methods such as Fourier Transform can be valuable in order to detect periodic behavior patterns and use them in order to set a proper baselines strategy (e.g., detect periods only in certain days and hours etc).

Linear average is more accurate in cases of small number of measurements; therefore, an average of one hour and one day over one week always use a linear averaging method.

Initial values:

Parameters that use linear average don't have initial values, i.e., initial values are set to zero. It should be noted that in any case, the system will not start with the 24×7 differential learning strategy (i.e., there is time to collect data).

As mentioned above, parameters that use IIR filters use adaptive steps for the first $n^{th}$ iterations (default of 4 iterations)

Choosing the Learning Strategy

Figure 7:
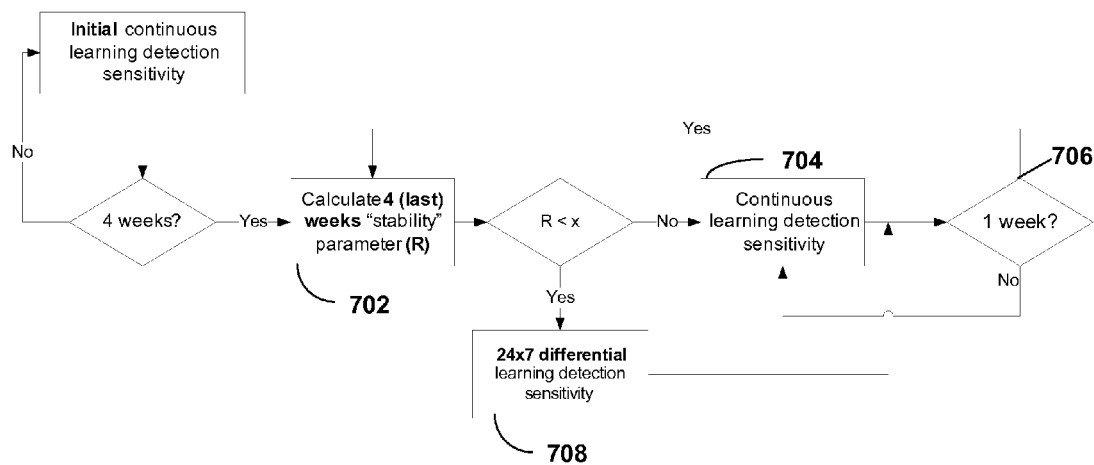
FIG. 7 illustrates the learning phases and conditions to transit from continuous detection sensitivity to 24×7 differential detection sensitivity (and back).

FIG. 7 illustrates the learning phases and conditions to transit from continuous detection sensitivity to 24×7 differential detection sensitivity (and back).

The initial type of detection sensitivity works according to the continuous learning base lines. After the first four weeks the system calculates, in step 702, a "stability parameter" (R) that measures if 24×7 differential detection sensitivity fits the protected web server or not. If not, then the system, in step 704, continues to use the continuous base lines and, in step 706, re-calculates R every one week (four weeks cyclic calculation). If R meets the stability condition, then the system, in step 708, switches its detection sensitivity to 24×7 differential base-lines. The system, in step 706, continues to check R every one week and act according to the stability condition. In any case, both 24×7 and continuous learning mechanisms continue to work all the time except for the time in which anomaly was detected—this will be specified in the system controller section.

Decision Engine

Major part of the decision engine is based on Fuzzy Logic Inference System (FIS). Every one second, the FIS collects all RT rate-based and rate-invariant parameters and generates a degree of anomaly accordingly. The FIS is adaptive which means that input member ship functions (MF's) are created every one hour according to continuous or 24×7 differential base lines.

Rate-based Parameters Input MF's

This section specifies the way that the membership function edges are set. It should be noted that in some cases the decision will be based on one parameter only. In these cases, a simple threshold is implemented (this will be specified per each case).

R_C and OutB_C input membership functions

The MF's that represent R_C, and OutB_C parameters are set as follow:

MF's edges: The following formulas refer to 24×7 differential base lines but also fit the continuous base as well:

$$\text{Normal edge: } N=\hat{Y}_{mn} \quad \text{Eq (10)}$$

$$\text{Attack edge: } A=\sqrt{l\times \hat{Y}_{nm}{}^M \times \hat{Y}_{mn}} \quad \text{Eq (11)}$$

$$\text{Suspect edge: } S=\sqrt{N\times A} \quad \text{Eq (12)}$$

Above equations follow a measure of variance ($\sqrt{N}$), a peak "attractor" ($\hat{Y}_{nm}{}^M$) and a detection sensitivity level (l) factor. The logarithmic nature of these formula aims to insure that lower average values would result in lower detection sensitivity (i.e., higher ratio between normal and attack edge).

Figure 8:
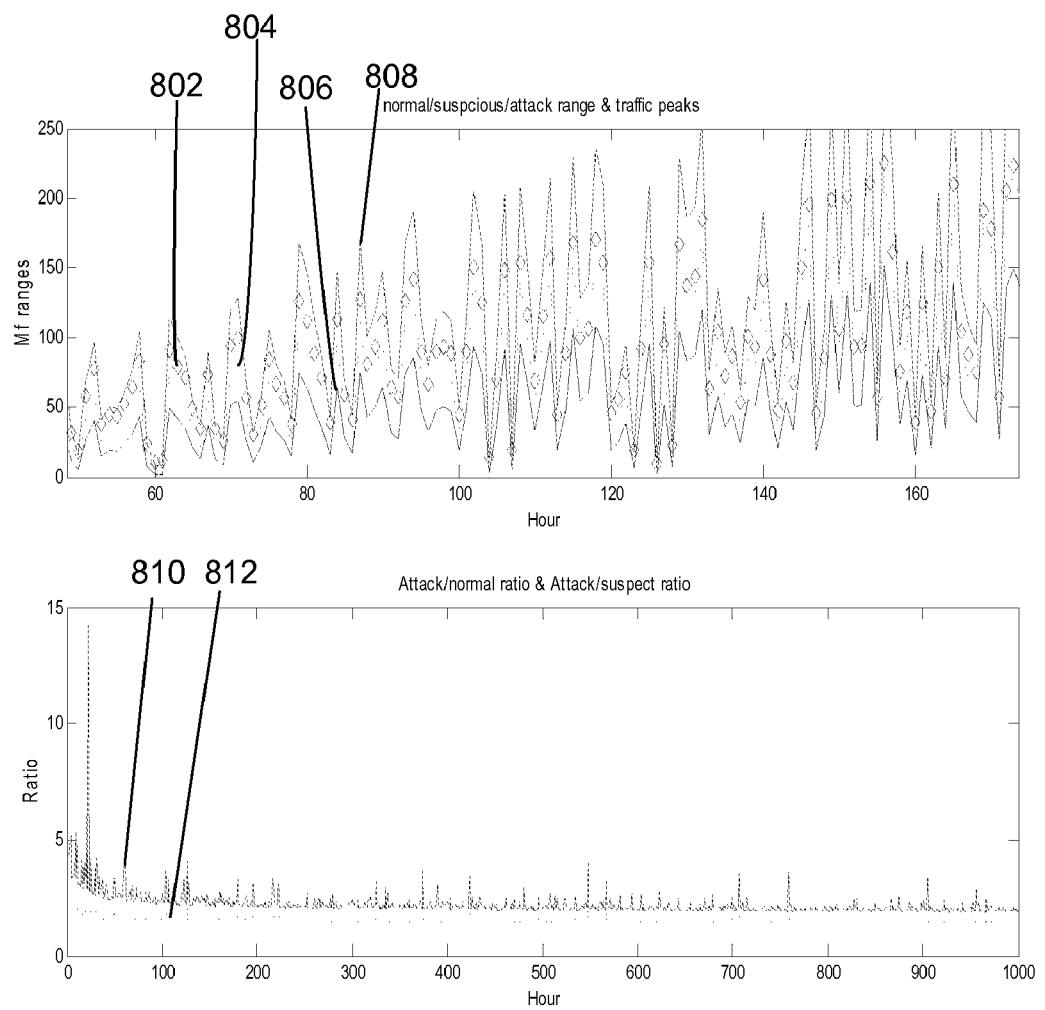
FIG. 8 illustrates input MF's edges simulation for HTTP request counters (i.e., R_C edges).

FIG. 8 illustrates the normal, suspicious and attack decision ranges (edges) that are created by the above formulas 10, 11 and 12 above.

Other HTTP request types threshold (Other_C)

Head request will follow simple thresholds. These threshold ranges will be set according to equations 11, and 12 above.

Max request rate per source—Max S_R_C

Max S_Get_C uses only continuous learning. This parameter will follow simple threshold ranges as well. The associated threshold ranges are created as follows:

$$\text{Normal edge: } N=\text{Max}\_S\_R\_C_n, \quad \text{Eq (12)}$$

$$\text{Attack edge: } A=\sqrt{l\times [\text{Max}\_S\_R\_C_n \times (\text{Max}\_S\_R\_C_n + \sqrt{\text{Max}\_S\_R\_C_n \times P})]}, \quad \text{Eq (13)}$$

$$\text{Suspect edge: } S=\sqrt{N\times A}, \quad \text{Eq (14)}$$

where P represents the level of expected peak (default=6), and l(1,2, . . . ,5) is a configurable detection sensitivity.

It should be noted that normal threshold isn't relevant for the detection.

Figure 9:
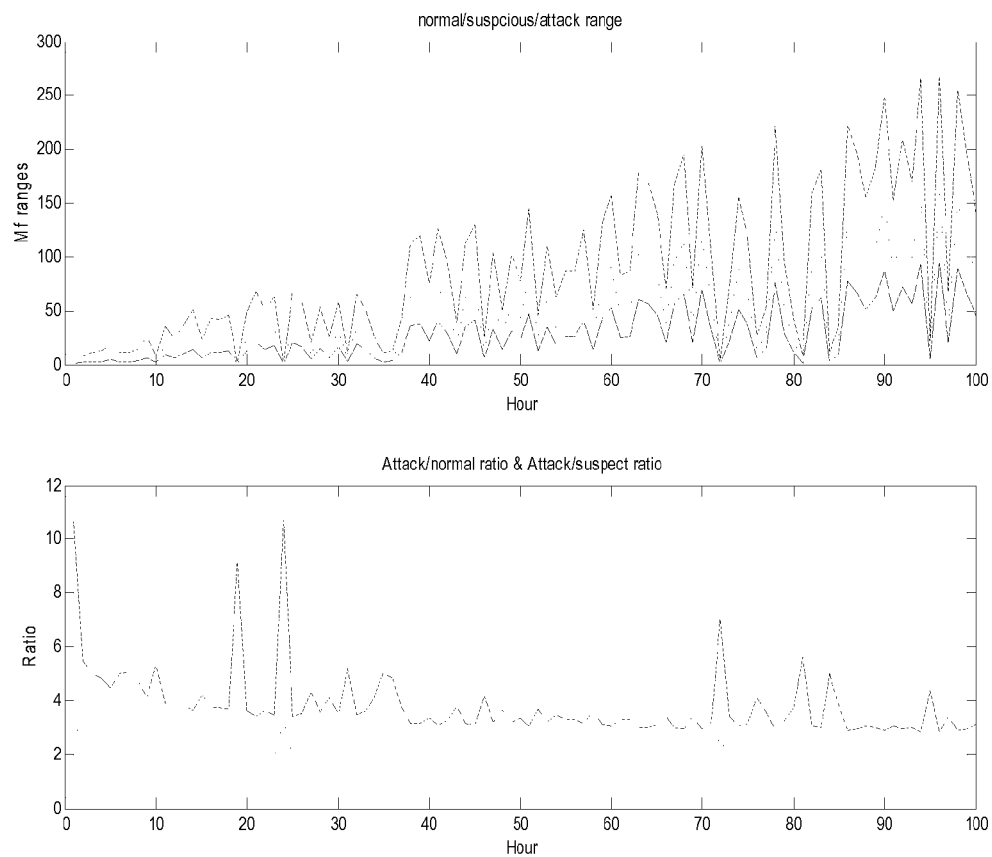
FIG. 9 illustrates input MF's edges simulation for the Max source request counter.

FIG. 9 illustrates such decision ranges.

Max number of request per connection—Max Con_R_C

Same as for max request rate per source.

Rate-invariant parameters input MF's

Out/R_P—ratio between HTTP request (R_C) to outbound bandwidth (OutB_C)

As specified before the RT formula of the ratio parameter is:

$$\text{Out/R\_P} = \frac{\text{OutB\_C}}{\text{R\_C}},$$

where OutB _C=Outbound bandwidth in this case is measured in KBytes per second.

As specified before, this parameter uses only the continuous learning mechanism.

Fuzzy edges will be created as follow:

$$\text{Normal edge: } N = \text{Out/R\_P}_n, \quad \text{Eq (16)}$$

$$\text{Attack edge: } A = N\times l\times \sqrt{N}, \quad \text{Eq (17)}$$

$$\text{Suspect edge: } S = \frac{A+N}{2}, \quad \text{Eq (18)}$$

where l (2, . . . ,5) is a detection sensitivity factor (configurable).

Request size distribution—Expected occurrences ranges (long-term size table)

As mentioned before:

$$P(i) = \frac{\text{S\_C}_i}{M},$$

where, $C_i$ is a request counter per size index (i) and $$M = \sum_i S\_C_i$$

is the total number of HTTP Get and Post requests.

A set of expected values E(i) in one second* is calculated as follow:

$$E(i)=P(i) \times R\_C_n, \qquad \text{Eq (19)}$$

where $R\_C_n$ is the total number of HTTP request (Post and Get) in one second*.

*The observation might take a few second before a decision can take place (in order to have enough measurements).

In order to save computation resources the normal, suspect and attack edges matrix may be calculated in advance for a few $R\_C_n$ cases.

The threshold per size grade (i) is set as follows:

Normal edge: $N(i)=E(i)$, Eq (20):

Attack edge: $A(i)=\sqrt{l \times [E(i) \times (E(i)+\sqrt{E(i)} \times P)]}$, Eq (21):

Suspect edge: $S(i)=\sqrt{A \times N}$, Eq (22):

where P is a confidence level (default=9) and l is a detection sensitivity level (1,2, . . . ,5).

Figure 10:
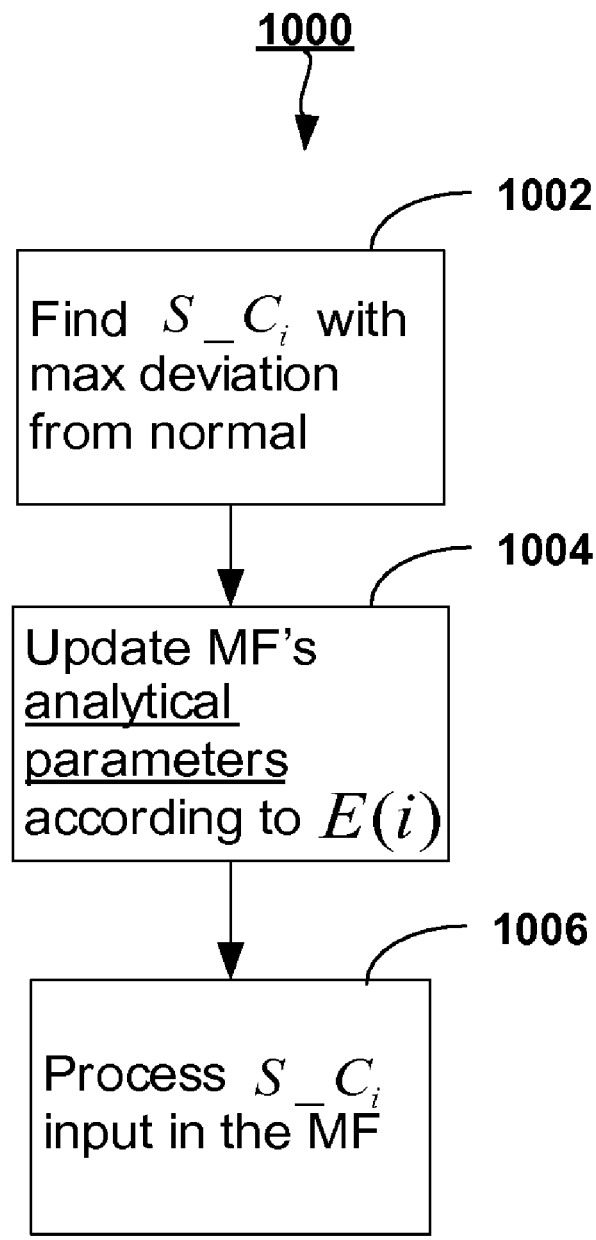
FIG. 10 illustrates the size deviation process.

FIG. 10 illustrates the size deviation process 1000. In step 1002, the size counter $S\_C_i$ that deviates the most (from normal) identified and E(i) is selected accordingly (i.e., according to size grade i). In step 1004, the MF's analytical parameters are updated according to E(i). The analytical fuzzy membership function receives the associated fuzzy edges parameters (N(i), S(i), A(i)) and sets the fuzzy shapes accordingly in real time.

MF Analytical Definitions:

Normal MF Function $$S(i) \geq X > N(i) \rightarrow \left\{ Y = -\left(\frac{1}{S(i)-N(i)}\right) \cdot X + \frac{S(i)}{S(i)-N(i)} \right\}$$

$$N(i) \geq X \rightarrow \{Y = 1\}$$

$$Y = DoF^N$$

Suspect MF Function $$S(i) \geq X \geq N(i) \rightarrow \left\{ Y = \frac{1}{S(i)-N(i)} \cdot X - \left(\frac{N(i)}{S(i)-N(i)}\right) \right\}$$

$$A(i) \geq X > S(i) \rightarrow \left\{ Y = -\left(\frac{1}{A(i)-S(i)}\right) \cdot X + \frac{A(i)}{A(i)-S(i)} \right\}$$

$$Y = DoF^S$$

Attack MF Function $$A(i) > X \geq S(i) \rightarrow \left\{ Y = \frac{1}{A(i)-S(i)} \cdot X - \left(\frac{S(i)}{A(i)-S(i)}\right) \right\}$$

$$X \geq A(i) \rightarrow \{Y = 1\}$$

$$Y = DoF^A$$

In step 1006, $S\_C_i$ is used as an input into the MF.

Decision Making Engine

Figure 11:
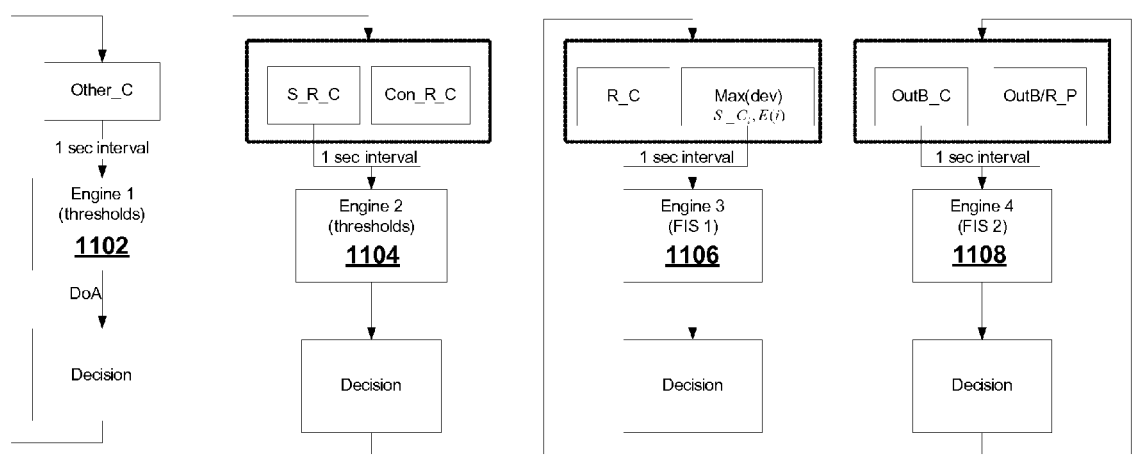
FIG. 11 illustrates the decision making engine.

FIG. 11 illustrates the decision making engine. There are four decision engines 1102, 1104, 1106, and 1108. Each of the decision engines generates DoA in an independent way (every one second). These engines are updated every one hour (MF's update and thresholds update) according to the adapted normal base lines (24×7 or continuous base lines). Engine 3 (FIS1) 1106 Max (deviation) MF is updated upon every size input (i.e., $S\_C_i$, E(i)) and the R_C MF is updated every one hour according to the R_C normal base-line.

Degree of Attack Triggers

DoA values are generated per each decision engine in the following way:

DoA Ranges

Engine 1—Other_C DoA ranges

Degree of attack is calculated as follows:

Normal=Other_C<Other_C$_{suspect}$,

Suspect=Other_C$_{attack}$>Other_C≧Other_C$_{suspect}$,

Attack=Other_C≧Other_C$_{attack}$, where Normal=2 (not relevant for the decision it self); Suspect=6 and Attack=10

DoA Characteristic: this DoA mechanism represents simple HTTP request flood that utilizes requests that are not Get or Post. It should be noted that the impact of this attack is usually low. Still, frequent HTTP requests (HEAD, PUT etc) can represent web intelligence gathering activities that need to be prevented.

Engine 2—Per Source Request Rate and per Connection # of Requests Thresholds

Degree of attack is calculated as follows:

Normal=Max_S_R_C<Max_S_R_C$_{suspect}$,

Suspect=Max_S_R_C$_{attack}$>Max_S_R_C≧Max_S_R_C$_{suspect}$,

Attack=Max_S_R_C≧Max_S_R_C$_{attack}$, where Normal=2; Suspect=6 and Attack=10.

It should be noted that the same goes for Max_Con_R_C. In this case, the maximum among these two counters determines the DoA for a decision.

DoA Characteristic: this DoA mechanism represents an inbound HTTP page flood which significantly raises the request rate per source IP or the total number of request per connection toward the protected server.

Engine 3 (FIS 1)—R_C/S_Ci

DoA ranges are defined as follows:

Normal=2-4
Suspect=5-7
Attack=8-10

DoA Characteristic: this DoA mechanism represents an inbound HTTP page flood which significantly raises the request rate toward the protected server (above the normal base lines).

Engine 4 (FIS 2)—OutB_C/OutB/R_P

DoA ranges are the same as for FIS 1.

DoA Characteristic: this DoA mechanism represents an inbound HTTP page flood which significantly raises the outbound traffic rate from the protected server—note that this attack isn't necessarily high rate request attack.

System Controller

The controller is responsible for the synchronization between the decision engine outputs and the mitigation methods.

The controller is a finite state machine that includes four major states:

a. Normal state (0)
b. Characterization state (1)
c. Mitigation state (2)
d. Suspicious activities state (3)

Figure 12:
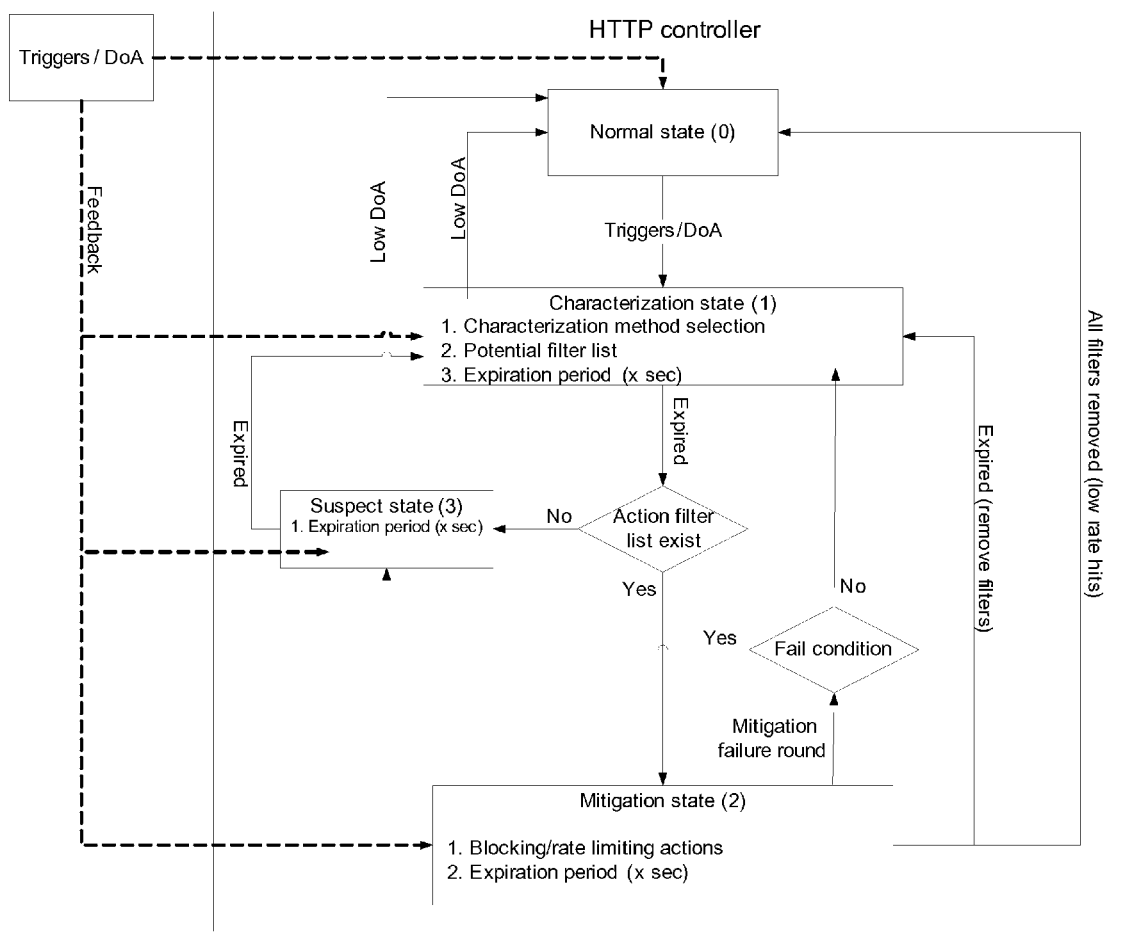
FIG. 12 illustrates the HTTP controller state machine transition rules and the actions that are taken in each state.

The controller is an event driven and time driven mechanism. FIG. 12 illustrates the transition rules and the actions that are taken in each state.

Normal State (0)

In "peace time" the system stays in the normal state. During this states that system continuously collect HTTP traffic statistics and update the normal base lines accordingly.

Characterization State (1)

Transition from normal state to characterization state occurs when one or more of the anomaly triggers is activated (1 second interval decision). During the operation of this state, if the DoA values are below 8 ("Attack range), a transition back to the normal state is occurred. During this state no learning is taken place, i.e., base lines are "freezed". This state comprises two internal processes (written in their actual order):

a. Selection of attack characterization method; and
b. Creation of action filter list.

Characterization Method Selection

The first process includes a decision making process about the type of anomaly that was detected and about the attack characterization method that need to be used in order to create action filters. This decision is made according to pre-defined rules that will be specified later on in the paper. This phase lasts between 2-4 seconds (default 4 seconds) in order to check the consistency of the anomalous parameters before deciding about the best attack characterization method.

Creation of Action Filters List

According to the selection process, the system activates the appropriate trapping mechanism that creates an action filters list. The list is ordered according to risk/impact analysis. The list includes suspicious source IP addresses, HTTP request sizes and request checksum(s). This process lasts between 4-10 seconds (default 6 sec) in which the action filter list is getting filled. When this phase is over (expired), a transition to state 2 or 3 is taken place.

Suspicious Activities State (3)

A transition to state 3 occurs in case that the action filter list is empty, i.e., the system couldn't find any potential countermeasure for the detected anomaly, or if the system has failed to mitigate the attack after a few iterations (this process will be explained later on). During this state no learning is taken place, i.e., base lines are "freezed".

During this state no actions are taken place and only anomaly statistics will be presented for the user.

A transition back to state 1 occurs in any case after an expiration period (default 120 seconds).

A transition to normal state (0) occurs if DoA below 8 is indicated. It should be noted that this state may include an optional blocking/rate limit mechanism. This mechanism rate limits the HTTP requests that are generated by specific source IP addresses. These sources can be selected according to the S_R_C or Con_R_C statistics.

Mitigation State (2)

No learning takes place in this state.

Mitigation actions are activated in this state. The mitigation actions are selected according to the action filter list that was created in state 1.

Mitigation options include:

a. Rate limit the traffic flows which are defined by Source IP(s)+HTTP request(s)/URL(s) checksum toward the protected server
b. Rate limit the traffic flows which are defined by HTTP request checksum(s)/URL(s) toward the protected server
c. Rate limit all traffic that is generated from specific source IP address(es) toward the protected servers These mitigation options are activated according to a closed feedback operations. There are two types of feedback:

a. Full DoA—DoA that is generated according to the all inbound traffic parameters, i.e., before the mitigation actions.
b. Filtered DoA—DoA that is generated according to the remaining traffic after mitigation action took place. This feedback type is more relevant when rate limit mitigation actions are taken place (i.e., during source IP full blocking, the filtered DoA isn't relevant for positive feedback purposes). Postive feedback means effective blocking. Negative feedback means non-effective blocking.

Generally, the mitigation action works gradually (from "gentle" to "rough") which means that in case of negative feedback the rate limit factor is adjusted (i.e., more drastic blocking measures are created). If all rate limit steps are implemented and still negative feedback is indicated, a transition back to state 1 is occurred.

After X continuous cases like this (X is between 2 and 4), the system will transit to state 3 (suspicious activities state).

State Expiration Period

A transition back to state 1 occurs when the state time-out is expired (expiration period is between 60 and 600 seconds. Default: 600). This transition is involved with removal of all filters. The reason for this transition is to allow the system to get-out from scenarios in which it "thinks" that the mitigation process works effectively while it really blocks legitimate traffic.

Transition to Normal State (Attack Termination)

In case that the system uses rate limiting mitigation actions, the system will transit to normal state (i.e., attack termination) if positive feedback is indicated according to both Full and Filtered DoA values. In case the system blocks traffic (i.e., blocks all HTTP traffic that s generated from a source address), there is no sense in measuring the filtered DoA for positive feedback decision (i.e., only negative feedback can be indicated in case that the wrong source IP is blocked). In this case, a transition to normal state will be decided according to a special feedback process—this will be defined later on.

The following sections will define, in a more granular manner, the decision and actions that are taken place in each one of the states:

State 1—Attack Characterization

Characterization Method Selection

According to the type of triggers that are responsible for transition to state 1, the system decides which attack characterization method will best fit the case. Table 2 below analyzes the relationship between possible HTTP flood attack characteristics, the decision engines and the characterization method:

TABLE 1

| # | Trigger case | Attack characteristics options | | Characterization method decision | Comment |
|---|---|---|---|---|---|
| | | Suspicious source addresses(es) | Suspicious request size(s) | | |
| 1 | Other_C trigger (Engine 1) | N/R | N/R | This case alone doesn't require attack characterization process | This case will be followed by, in any case, "Other" request blocking |
| 2 | Source/connection thresholds (Engine 2) | Exist (always) | N/R | Source IP trap buffers | Detects repeated HTTP request pattern(s) per suspicious source(s). |
| 3.1 | FIS 1 - R_C/ S_Ci (Engine 3) | Exist | Exist (always) | Source IP trap buffers | Detect repeated HTTP request pattern(s) per suspicious source(s) |
| 3.2 | FIS 1 - R_C/ S_Ci (Engine 3) | Not exist | | Request size trap buffers | Detect repeated HTTP request pattern(s) per suspicious request size(s) |
| 4.1 | FIS 2 - OutB_C/ OutB/R_P (Engine 4) | Exist | Not Exist | Source IP trap buffers | Detect repeated HTTP request pattern(s) per suspicious source(s) that cause uplink B/W consumption. |
| 4.2 | FIS 2 - OutB_C/ OutB/R_P (Engine 4) | Not exist | Exist | Request size trap buffers | Detect repeated HTTP request pattern(s) per suspicious request size (s) |
| 4.3 | FIS 2 - OutB_C/ OutB/R_P (Engine 4) | Not exist | Not exist | No characterization | Anomaly detection only (suspicious state). |

Simultaneous Triggers

The characterization method is chosen after a consistency check that is done in state 1, i.e., only persistent triggers (high DoA that is consistent) will take part at the decision. Simultaneous triggers will be handled as follows:
  a. Persistent Other_C trigger will always be followed by blocking of any HTTP request which is not Get or Post regardless to the other triggers as mentioned in the table above
  b. In case both FIS1 (engine 3) and FIS2 (engine 4) generate high (and persistent) DoA then characterization process will treat it as FIS1 (engine 3) trigger type.

Figure 13:
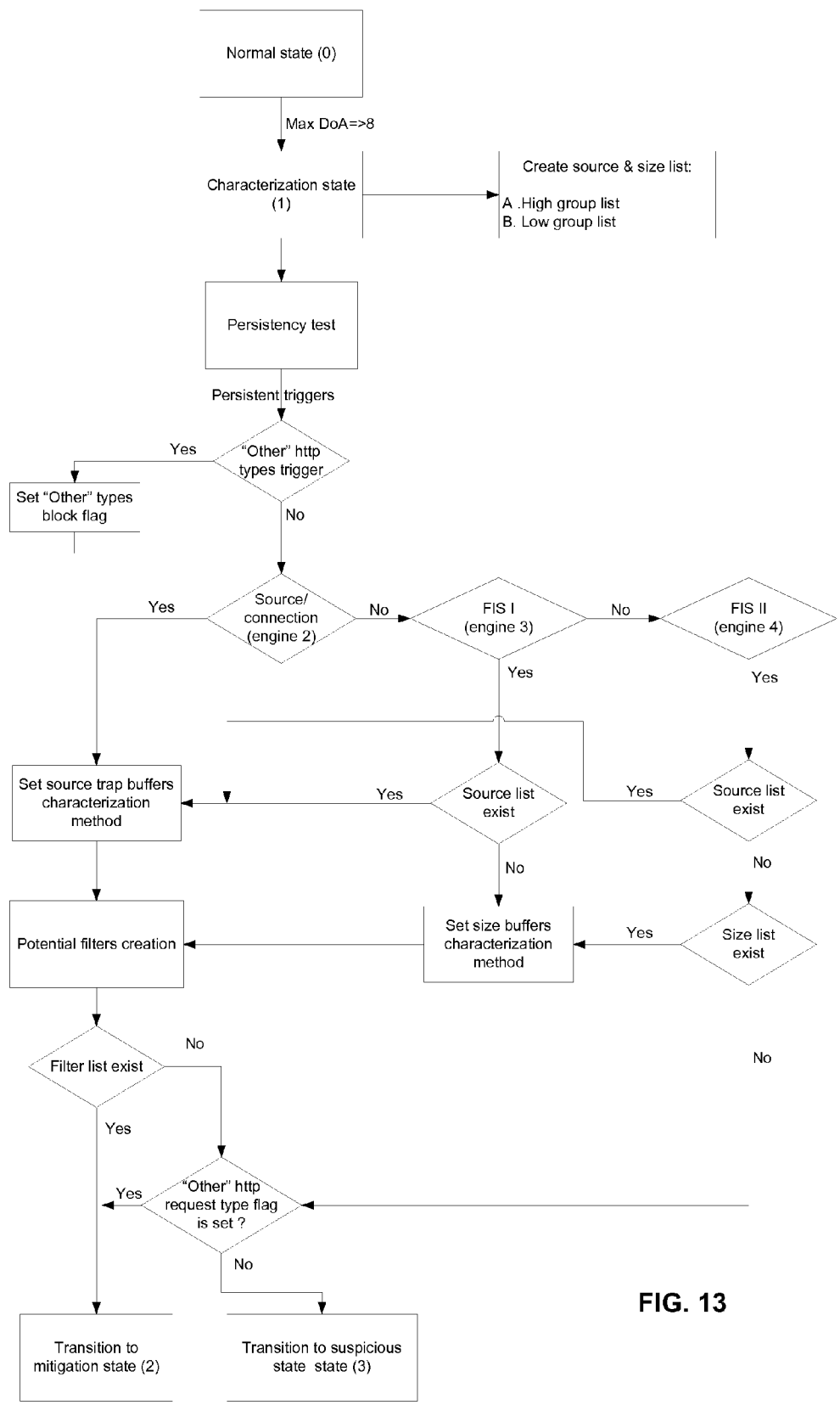
FIG. 13 illustrates a flow chart describing the selection flow that takes place in the characterization state.

FIG. 13 illustrates a flow chart describing the selection flow that takes place in the characterization state. It should be noted that the transition to state 1 from state 0 is done according to the max DoA value among all the DoA's that are generated by the four engines.

Persistency Test—1302

Figure 14:
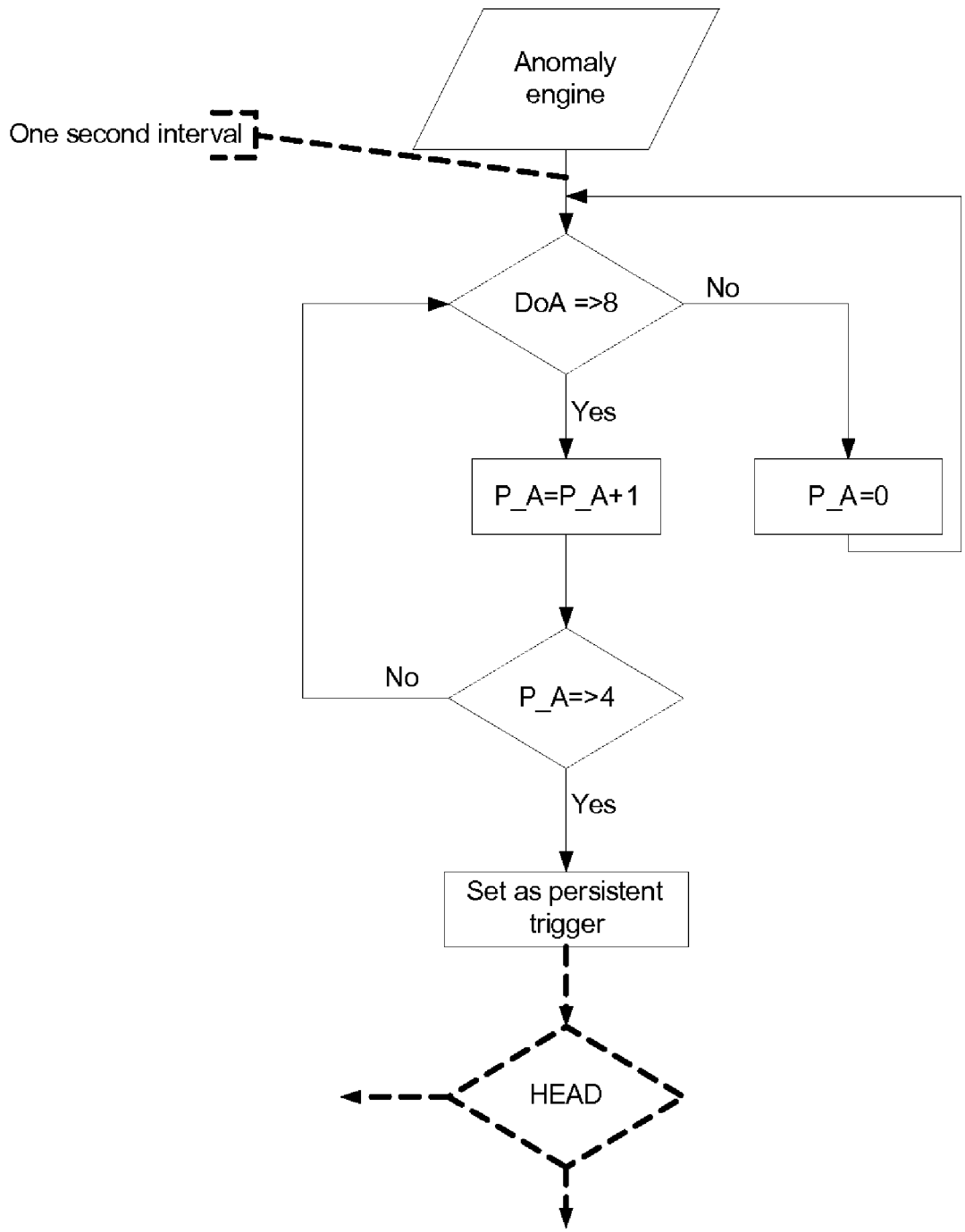
FIG. 14 illustrates the DoA persistency test.

The persistency test in state 1 includes a simple Full DoA counter condition. The condition is defined as shown in FIG. 14 per each one of the four anomaly engines. In FIG. 14, P_A is a Persistency Attack counter.

Creating Source and Size Suspect Lists—1304

Figure 15:
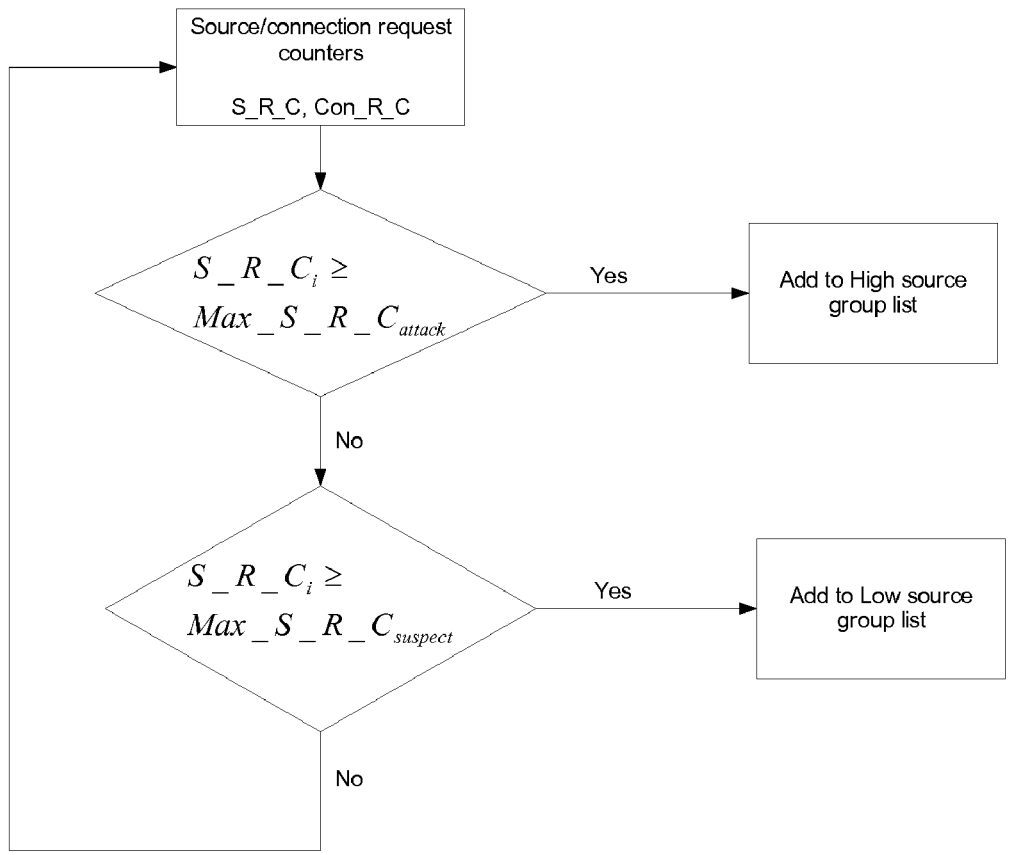
FIGS. 15 and 16 illustrate the creation of the source IP list and HTTP request size list, respectively.
Figure 16:
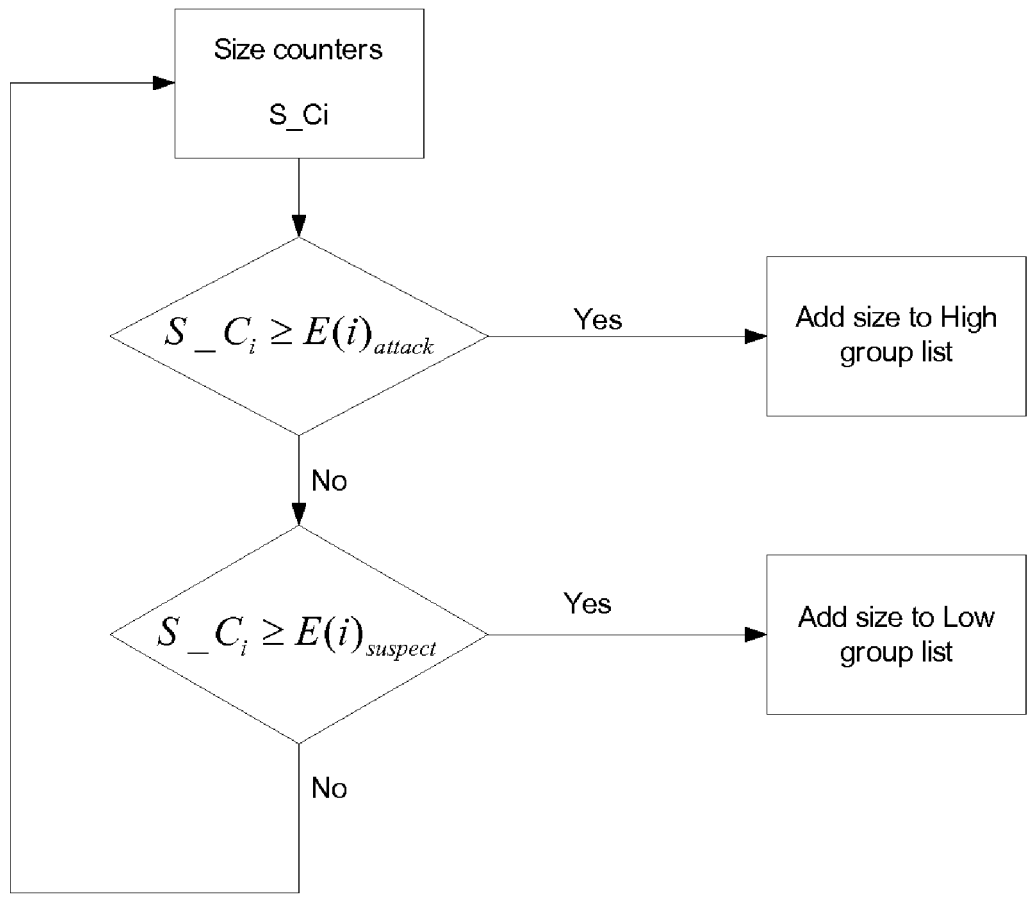

During the first 4 seconds of the persistency test in state 1 the system collects all suspicious sources and HTTP request (URL's) sizes and creates the following two lists:
  a. Source IP suspect list
  b. HTTP Request size suspect list Each list contains two sub-groups: High group and Low group. FIGS. 15 and 16 illustrate the flow defining how these two suspect lists are created. FIG. 15's flow refers to both source request counter (one second counter) and connection request counter (i.e., number of HTTP request per TCP connection).

Suspect List Restriction

A condition on the number of suspicious sources and sizes is enforced. The condition will be that above 1000 (range can be between 1000 to 5000) suspicious source IP addresses, the system will select the size trap buffer attack characterization method. In case that the number of suspect request sizes (URLs) is above 20 (range can be between 5-100), then the system will transit to the suspect state (state 3).

Source Action Filter List Restriction

Per source IP, a limitation of no more than 10 requests URL filters will be implemented in the source action filter list.

Motivation: Too many suspicious URL sizes or source IP addresses means higher probability of false positive decisions.

Action Filter List Creation (State 1)

According to the information that was collected in the previous process in state 1 (i.e., content of the suspect lists), an action filter list is created according to an internal attack characterization process. Attack characterization is made trough two types of "trap" buffer mechanisms:
  a. Source trap buffer
  b. Size trap buffer This characterization process lasts between 4-10 seconds (default 6) seconds.

Source Trap Buffer

Source trap buffers can be created for each one of the source IP addresses that are in the source suspect list. Each buffer is N cells long (default of 5 cells. an option to extend it up to 10 sells is implemented). Each cell contains:
  a. One checksum value S that represents a specific HTTP request-URI.

b. HTTP Request counter $C_s$, c. HTTP request threshold $Th_S$, (it is a dynamic threshold)

Each cell represents a different HTTP request URL that have been made to the protected web server from the associated source IP address and the counter represents the number of repeated same URL requests. When the counter breaches the request threshold $Th_s$, the checksum value together with the actual request-URL is added to an action filter list. In the case of source trap-buffer, the request-URL (or a few URL's) is added to the action filter list together with the associated source IP address.

The trap buffer is a time driven cyclic buffer, meaning that HTTP request(s) are shifted up in the buffer every $\Delta T$ second (together with their associated counter and dynamic threshold). In case that that a new request arrives to a full buffer (i.e., all buffers are already occupied), it is ignored.

The threshold Th in each cell is tuned/updated upon every shift (i.e., $\Delta T$) until it arrives to the $N^{th}$ cell. The "oldest" request stays in the last cell of the buffer until a new not existing request is arrived (this is important in order to detect relatively low rate HTTP request URL flood).

Figure 17:
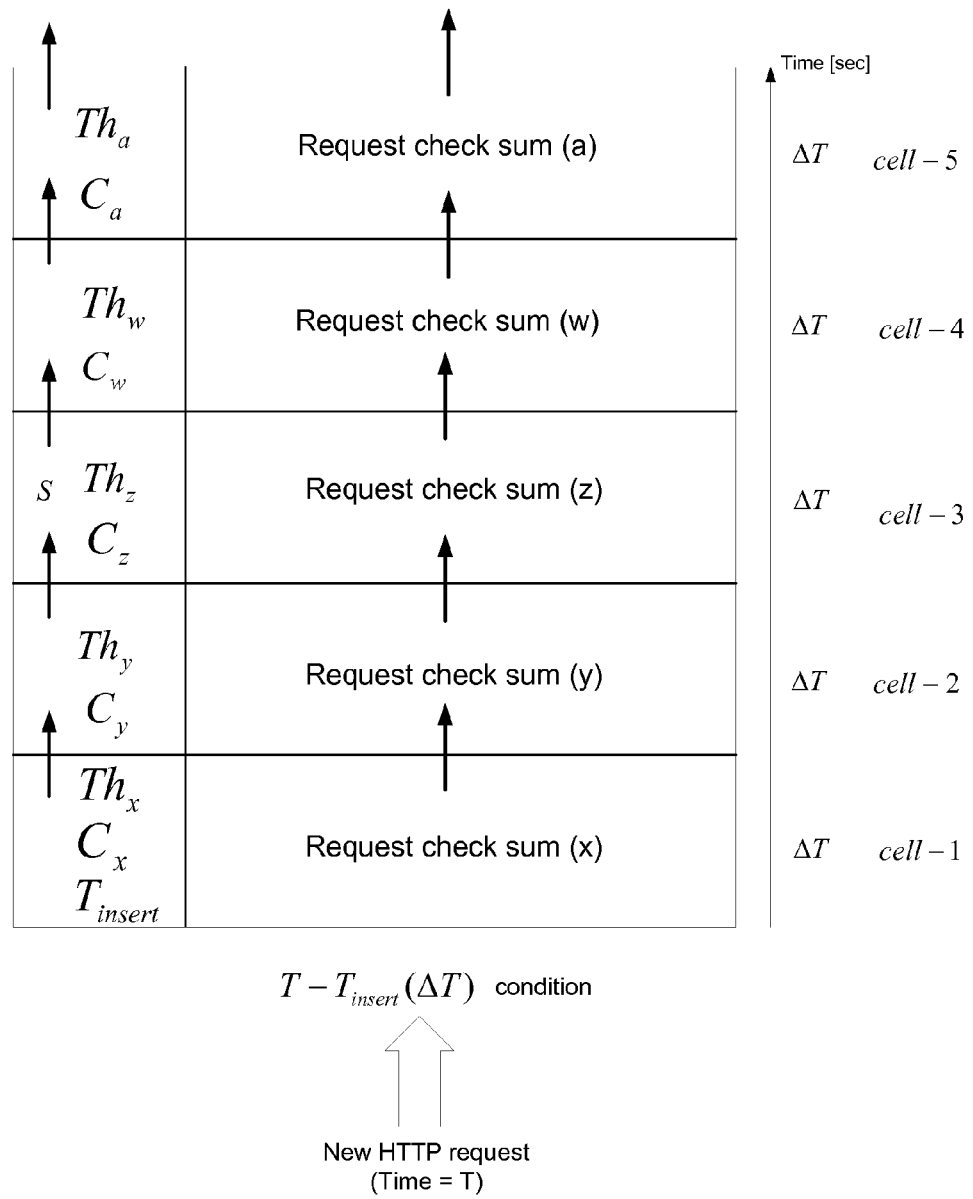
FIG. 17 illustrates the source buffer.

FIG. 17 illustrates the cyclic buffer structure of the source buffer. In FIG. 17:

$$Th_s = \sqrt{[\overline{E}_s(i)] \times (\overline{E}_s(i) + \sqrt{\overline{E}_s(i) \times P})]}, \qquad \text{Eq 23.}$$

$$\overline{E}_s(i) = P_s(i) \times R_{rps} \times \Delta T \times \text{Cell-}n. \qquad \text{Eq 24.}$$

S≡Checksum value of the HTTP request URL.

$C_s$≡Number of checksum S hits.

$P_s(i)$≡The adapted probability of the size (i.e., size grade) of the associated HTTP request URL.

P≡Confidence level.

$R_{rps}$≡The HTTP request rate (request per second) origin at the source address.

This rate is measured in the first second after the source trap buffer is created and is used for the rest of the trap-buffer lifecycle. An option to update this parameter every one second will be implemented as well (in order to have a better accuracy in cases of dynamic rate attacks).

$\Delta T$≡Cell shift time is 0.5 sec (range can be between 0.1 to 10 sec).

cell-n≡Current cell number (n=1, . . . , N) and N≡buffer length (N is a configurable value).

Figure 18:
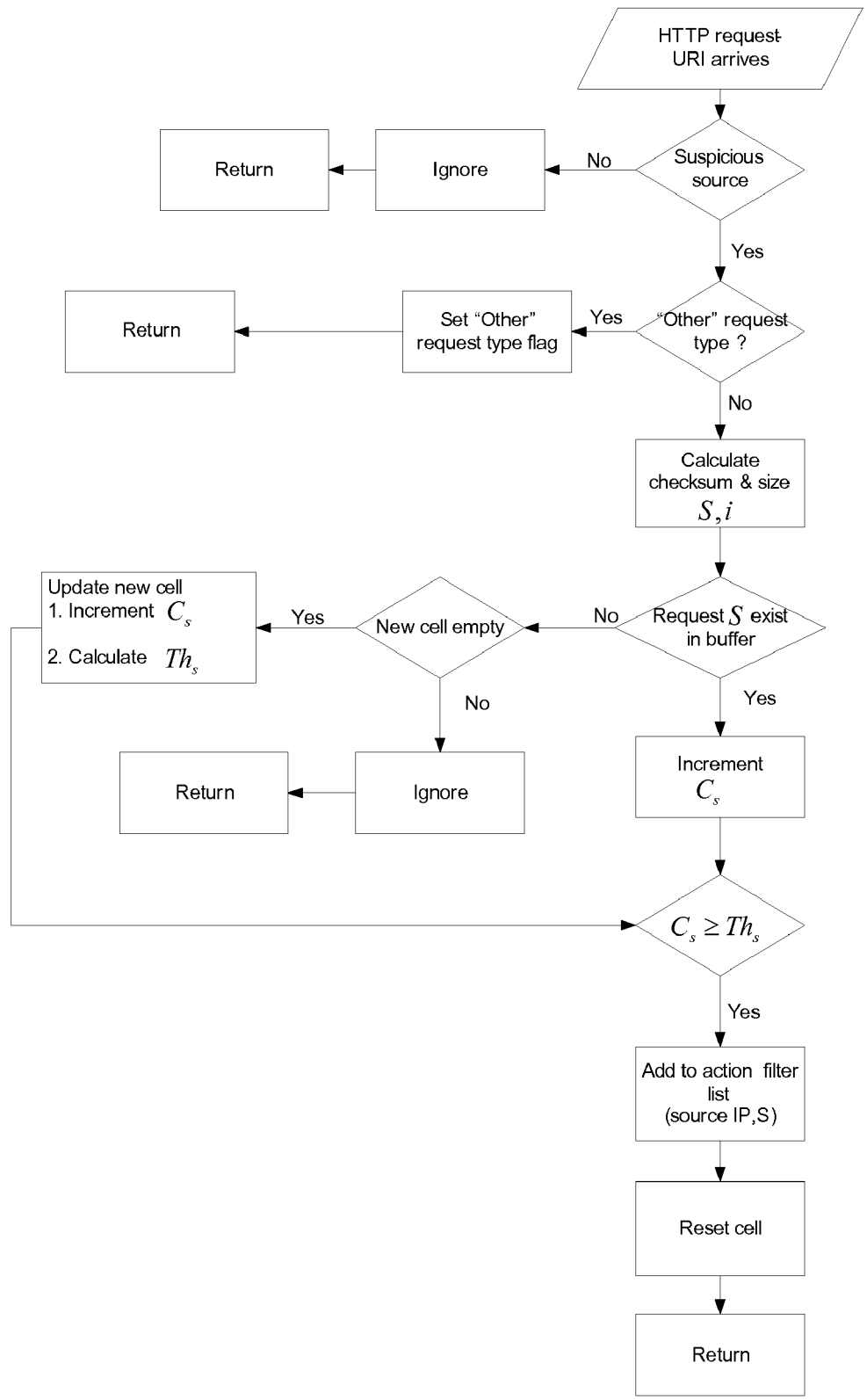
FIG. 18 illustrates a flow chart depicting the source buffer event driven flow.

FIG. 18 illustrates a flow defining the source trap buffer event driven update procedures. It should be noted that:

Source trap buffer is created upon classification of the first request from a "suspicious" source IP address, i.e., an address that exists in the low or high sub-lists of the suspicious source list.

Trap-buffers are terminated upon transition to mitigation state.

This trap buffer should handle problematic scenarios such as HTTP proxy low rate HTTP floods, mix rate attacks, attacks with decoys, and high probability request-URL flood.

Size Trap Buffer

In case that an anomaly was detected but only suspicious HTTP request URL sizes were detected (or the number of suspicious sources have passed the pre-defined restriction), then the system activates the size trap buffer. This is a time driven cyclic buffer that aims to detect repeated HTTP requests per request-URL size (i.e., size grade).

This buffer mechanism is identical to the source IP trap buffers mechanism. The output of each size trap-buffer is one or a set of HTTP request checksum value(s), the actual request-URL strings, and the associated exact string size.

In this case, each trap buffer represents one URL size grade that was deviated from the normal expected occurrences value (E(i)). Therefore, $\overline{E}(i)$ is set per each trap buffer. The thresholds are set as follows:

$$Th_{size} = \sqrt{[\overline{E}(i) \times (\overline{E}(i) + \sqrt{\overline{E}(i) \times P})]}, \qquad \text{Eq 25.}$$

$$\text{where } \overline{E}(i) = P(i) \times R_{rps} \times \Delta T \times \text{Cell-}n. \qquad \text{Eq 26.}$$

P(i)≡The occurrences probability according to the size (size grade) of the associated trap-buffer.

P≡Confidence level.

$R_{rps}$≡The HTTP request rate (request per second). This rate is measured in the first second after the size trap buffer is created and is used for the rest of the analysis operations. Please note that this rate refers to the overall HTTP request rate toward the protected server.

$\Delta T$≡Cell shift time 0.5 sec (range of 0.1-10 sec).

cell-n≡Current cell number (n=1, . . . , N) and N≡buffer length (configurable between 3-10. default:5).

False negative note: Because the HTTP request size distribution is actually per size range and is not tailored per specific size and also because that different HTTP requests URL's can be of the same size, the probability is limited in its accuracy. This inaccuracy will can result in misdetection events (i.e., false negative).

Analyzing probability of each HTTP request URL or request size isn't really a solution that can scale, therefore the size grade strategy was chosen.

Figure 19:
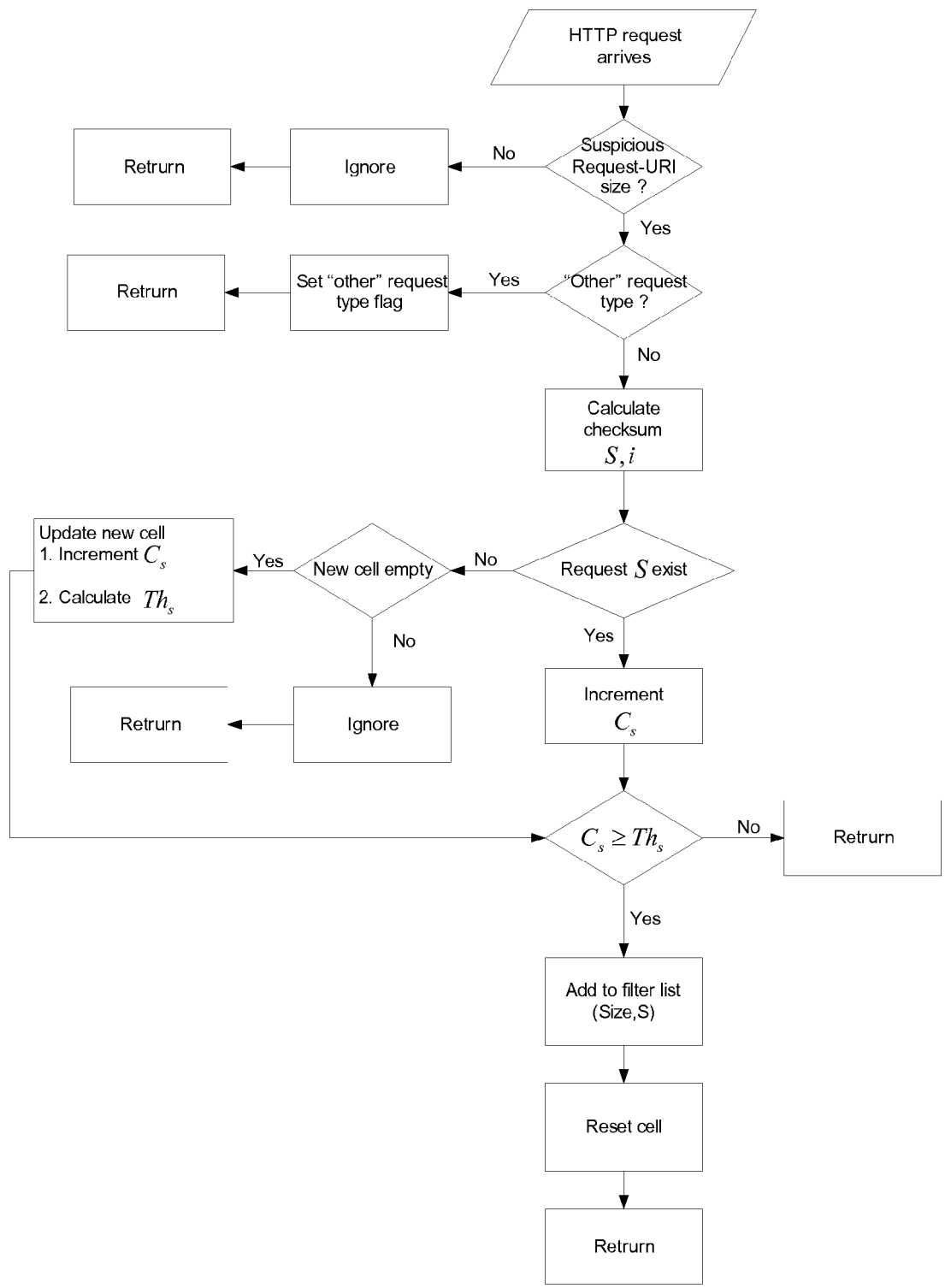
FIG. 19 illustrates a flow chart depicting the size trap-buffer event driven flow.

FIG. 19 illustrates the flow describing the event driven update mechanism.

Action Filter List Creation

The final step in the characterization state (state 1) is to create an action filter list consisting of source IP addresses and their associated HTTP request(s) (i.e., actual request-URL strings) or, list of HTTP request sizes and their associated HTTP request-URL strings—all according to the trap buffers' outputs.

Figure 20:
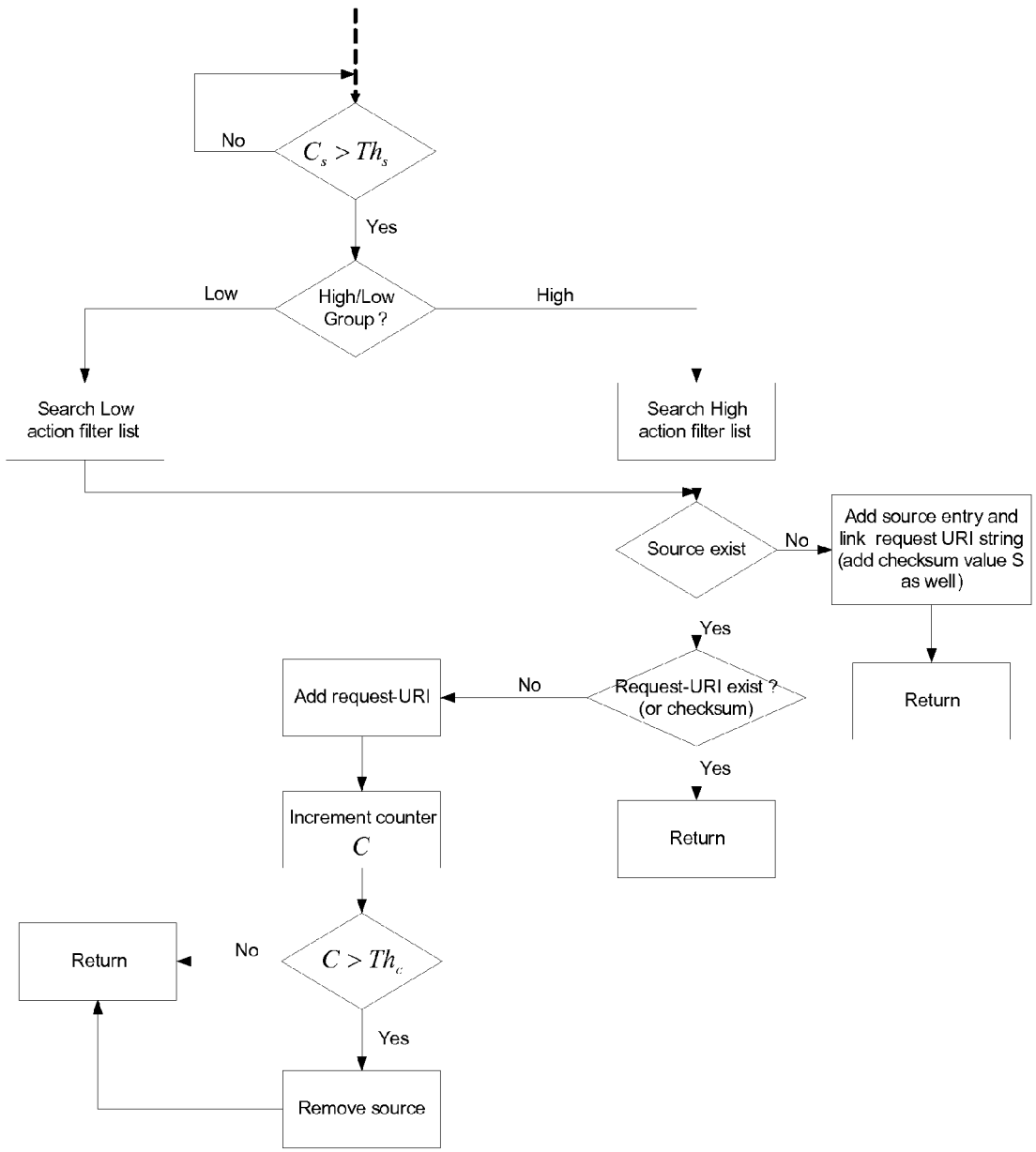
FIG. 20 illustrates a flow chart depicting source filter list creation.

FIG. 20 illustrates the flow describing the process in which these action filter lists are created. In FIG. 20, $C_s$ is the counter that represent the number of checksum (S) hits.

High action filter group—The list of source IP addresses that belong to the high (more "dangerous") group Low action filter group—The list of source IP addresses that belong to the low group (less "dangerous")

C is the number of different checksum values (S) that are associated with the same source IP address.

$Th_c$—This threshold controls the number of different checksum values that can be associated with one source IP address. Above this threshold, it will be too risky to block/rate-limit the source and its associated HTTP request. Therefore, the source will be removed from the action filter list and the suspicious source list (so it will not be detected again).

Figure 21:
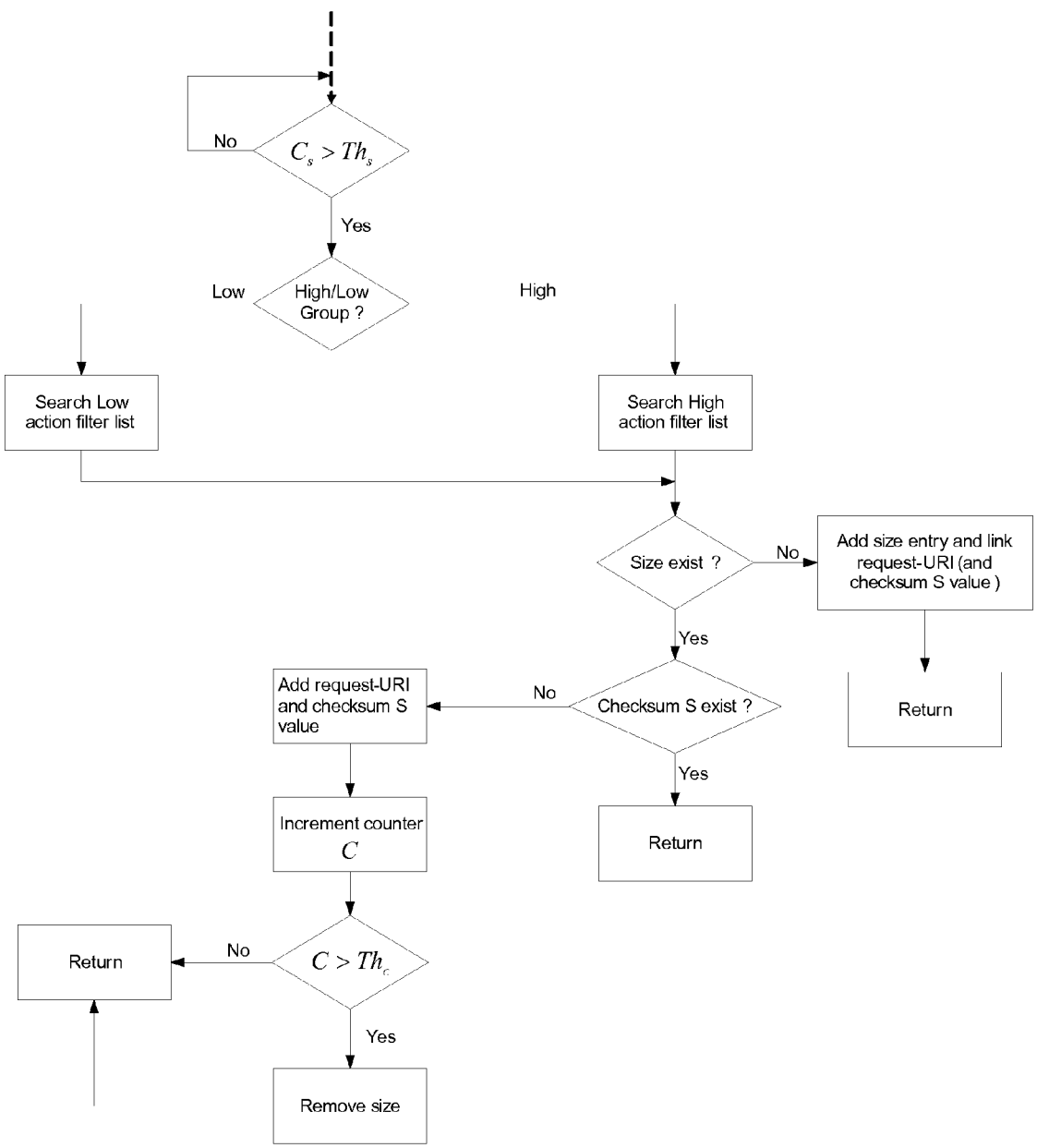
FIG. 21 illustrates a flow chart depicting size filter list creation.

The same process goes for the size action filter list creation:

FIG. 21 illustrates size filter lists creation.

Mitigation State (State 2) & Feedback Operations

In this state all mitigation actions are taken place based on action filter lists that were created in state 1. The mitigation process is gradual, i.e., starts "light" and become more "aggressive" if negative feedback is identified. The mitigation process stops when an end of attack (attack termination) is identified.

There are four different mitigation methods that can take place in this state (some of them simultaneously):

a. HTTP "other" request types blocking—block HTTP request that are not Get or Post.

b. Source mitigation—Rate limit specific HTTP request-URL(s) that are generated by specific IP addresses. Rate limit is set according to a predefined rate-limit factor steps.

c. Size mitigation—Rate limit specifics HTTP request URL(s). The rate limit is set according to the adapted E(i).

"Other" Request Blocking

In case that "other" request types flag was set in state 1, during state 2 the system will block any request that is not Get or Post.

Identification of attack termination in case of pure "Other" HTTP request types flood attack will be according to full DoA values (see below how it works in case of source mitigation).

Source Mitigation

In case the source mitigation method was chosen in state 1, upon transition to state 2, the system starts to prevent the HTTP flood attack according to the source action filter lists (High and Low lists). The action filter list includes source IP addresses and their associated HTTP request-URL(s).

Figure 22:
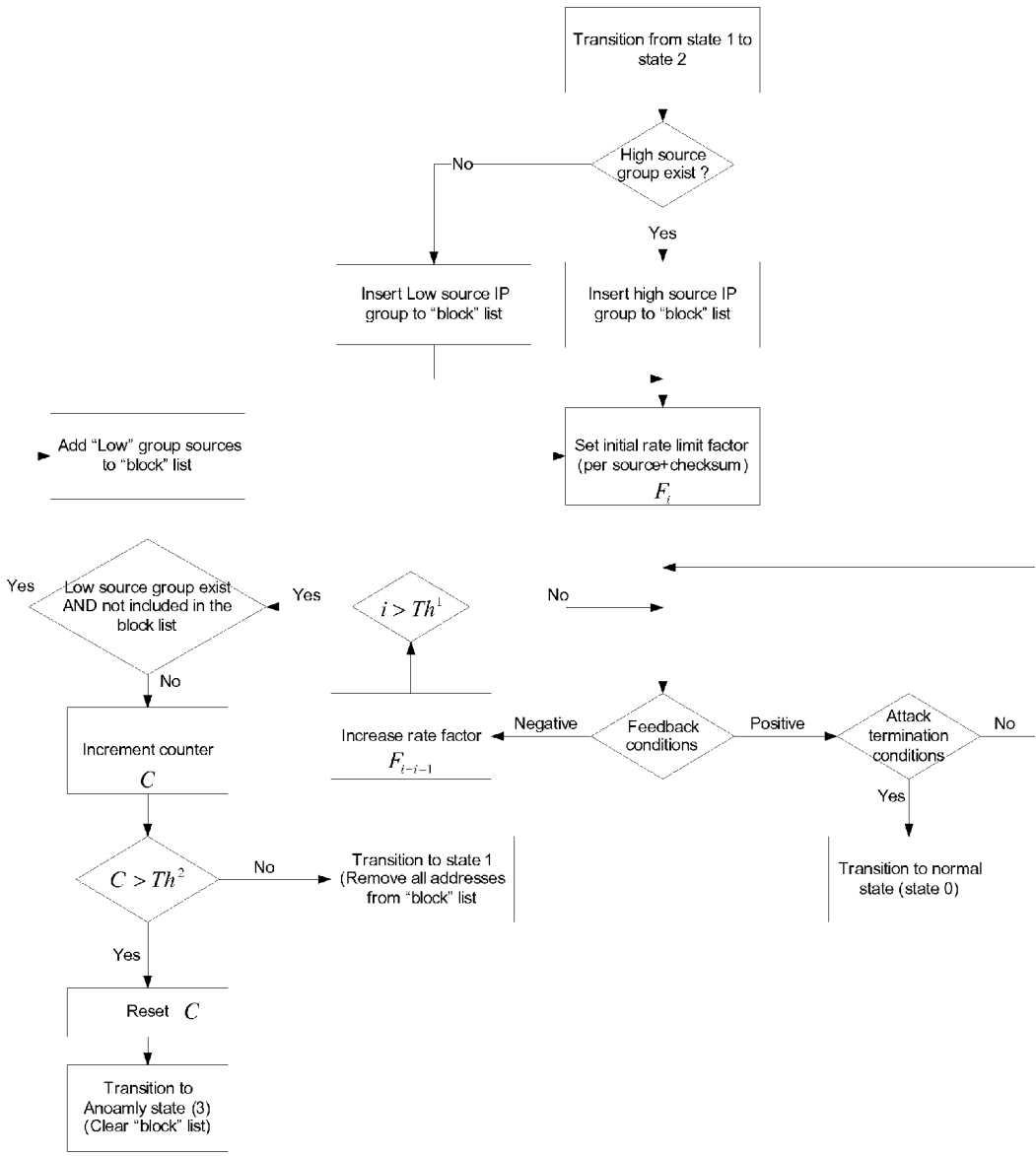
FIG. 22 illustrates a flow chart depicting the gradual source rate limit mechanism.

FIG. 22 illustrates the gradual source IP rate limit mechanism.

Rate Limit Factors—$F_i$

The rate limit applies to all source IP's and their associated HTTP request-URL(s) strings. This factor is actually an HTTP request rate limit. One of two options to set the rate limit factor will available through configuration:

a. Automatic rate limiting b. Manual rate limiting—manual rate limit will be defined later on.

In automatic mode the rate limit factor $F_i$ will be set as given below in Table 3:

TABLE 2

| Rate limit step (i) | $F_i$ | Rate limit percentage (traffic offload) | Comment |
|---|---|---|---|
| 1 | 2 | 50% | Initial factor |
| 2 | 4 | 75% | Set upon negative mitigation feedback indication |
| 3 | $F_f^1 = \infty$ | 100% | Full block of suspicious http request URL that are generated by the suspicious source IP(s) (In order that this action will be allowed, a full block mode should be enabled) |
| 4 | $F_f^2 = \infty$ | 100% (configurable) | Any http request URL rate limit factor (In order that this action will be allowed, a full block mode should be enabled) | where, $F_i$ is the rate-limit factor that refers to HTTP request traffic that is generated from all sources in the block list. For example, if the value of this factor is 4 then every $4^{th}$ HTTP request, that matches one of the blocked sources and its associated checksum value, will be allowed to pass.

There are four rate limit steps that are taken place according to the closed-feedback process. The final steps $F_f$ represents a "full" (very aggressive) blocking method and will only be used in case the protection system was configured to work in a "Full block" mode (i.e., "full block" mode is enabled).

Full block mode—$F_f^2$ means that all HTTP requests URLs that are generated by the suspicious source IP addresses are rate limited. $F_4$ is a configurable factor—possible values are:

a. 25% (25% http request URL traffic offload)

b. 50% c. 75% d. 100% (default—100% means that all traffic from the suspicious sources is blocked (including the SYN packets)

The default $Th^1$ value is 2. In case of "Full block" mode, $Th^1$ is set to 4 (because there are two more feedback iterations that can take place and mitigate the attack).

Mitigation Feedback Process

Figure 23:
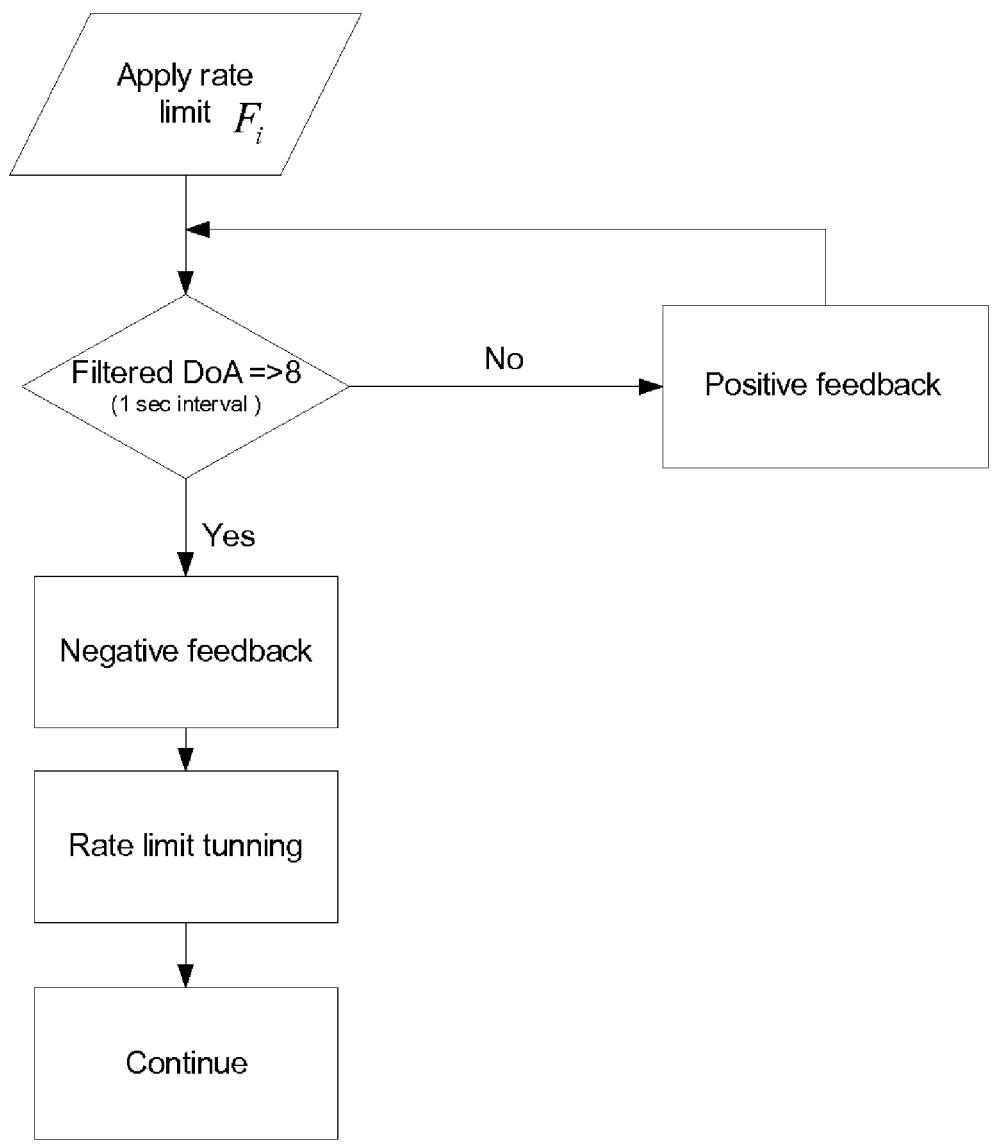
FIG. 23 illustrates a flow chart depicting the mitigation feedback process.

FIG. 23 illustrates the mitigation feedback process to identify positive and negative feedback.

It should be noted that a mitigation negative feedback persistency counter should be considered (i.e., in case of oscillation no feedback will be indicated and the existing status will remain unchanged). This counter will identify if the negative feedback is persistent for between 2 to 4 seconds (default 2 sec)

Transition Back to State 1 (Unsuccessful Mitigation)

If mitigation negative feedback is identified after all rate limit steps where implemented, the system will remove all sources from the block list and a transition back to state 1 will take place. This transition will help handle cases in which the attack's characterization is changing (e.g., new IP address attack the server, new HTTP request-URL(s) are used as part of the HTTP flood etc).

After a predefined number of transitions back to state 1 ($Th^2$, default 3), the system will transit to state 3 (suspect state).

End of Attack Identification

Figure 24:
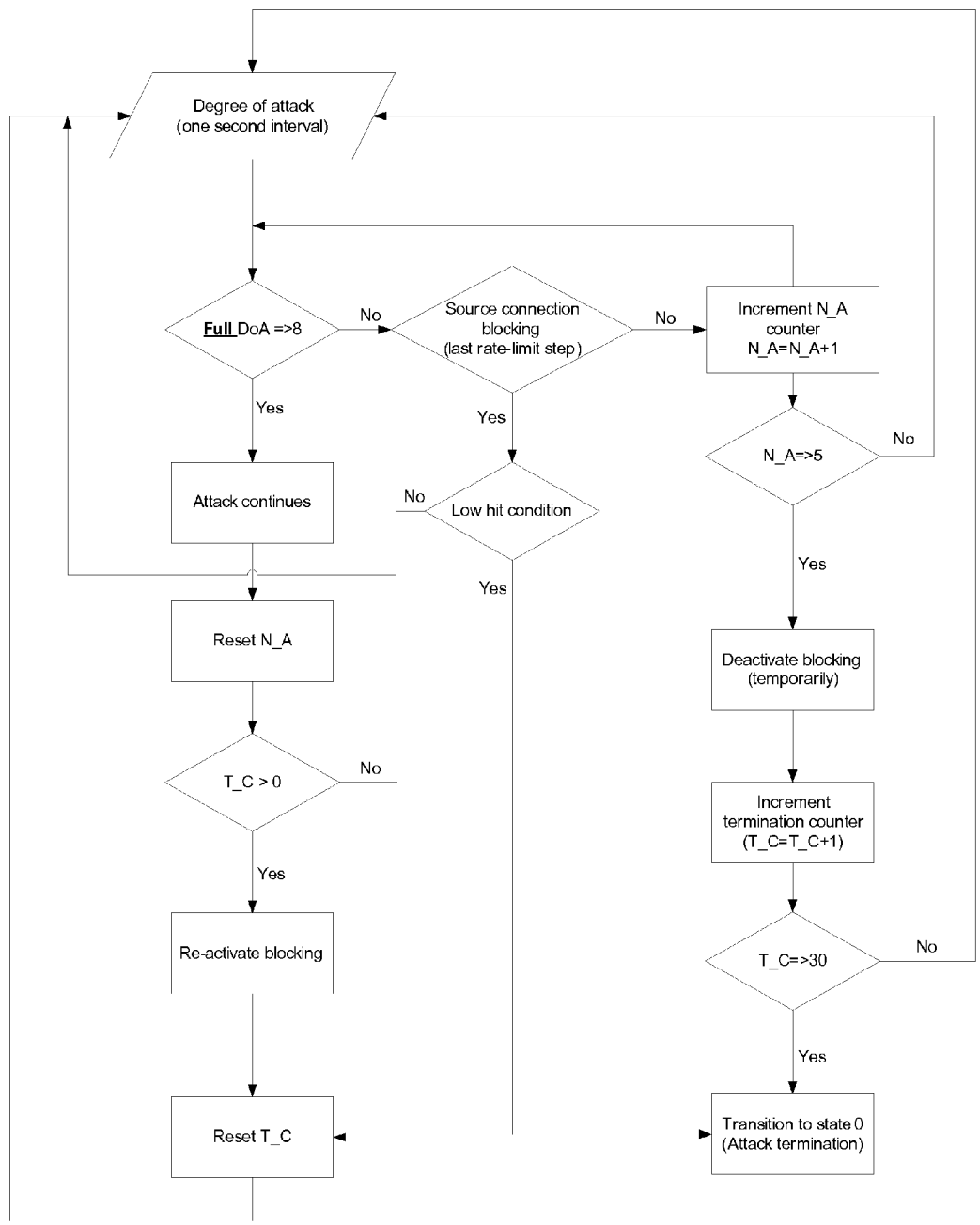
FIG. 24 illustrates a flow chart depicting the attack termination condition.

FIG. 24 illustrates the attack termination condition (source mitigation case). End of attack is identified in state 2 according to the process described in FIG. 24. When the Full DoA stays, persistently, below 8, blocking will be temporarily deactivated. If during this the Full DoA stays below 8 for a pre-defined period (default 30 seconds) then the system will transit to state 0, i.e., attack termination.

The motivation is to check if the attackers adapt the rate condition (through their TCP's flow control mechanism—this is relevant for a more sophisticated HTTP flood tools), thus will prevent frequent re-opening of continuous HTTP flood attack. If during the 30 seconds the system identifies an attack (i.e., Full DoA=>8), the blocking is implemented again until the termination condition is met again.

Low hit condition—This condition is relevant only when the suspicious source IP addresses are completely blocked (i.e, final rate limit step of 100%).

This scenario doesn't allow a good measure of Full DoA because an HTTP connection cannot be established. Therefore, termination will be executed only if the block list is "idle" for a pre-defined period (default: 10 sec). If the low hit rule is met and the Full DoA is still below 8, a transition to state 0 occurs. "Idle" means that no block list hit occurred It should be noted that the full block mode can be problematic when the attack is generated behind a proxy server (i.e., all connections will be blocked and new, legitimate; connection attempts will maintain a steady activity which will not allow terminating the attack). Having said this, proxy's source IP address will probably not be inserted into the block list in the first place because the source trap buffer will not detect suspicious HTTP request checksum value(s) when significant legitimate traffic is generated from the same source IP address. This problematic case will usually result in transition to anomaly state (3).

Size Mitigation

In case this method was chosen (in state 1), upon transition to state 2, the system starts to prevent the HTTP flood attack according to the size action filter list.

Figure 25:
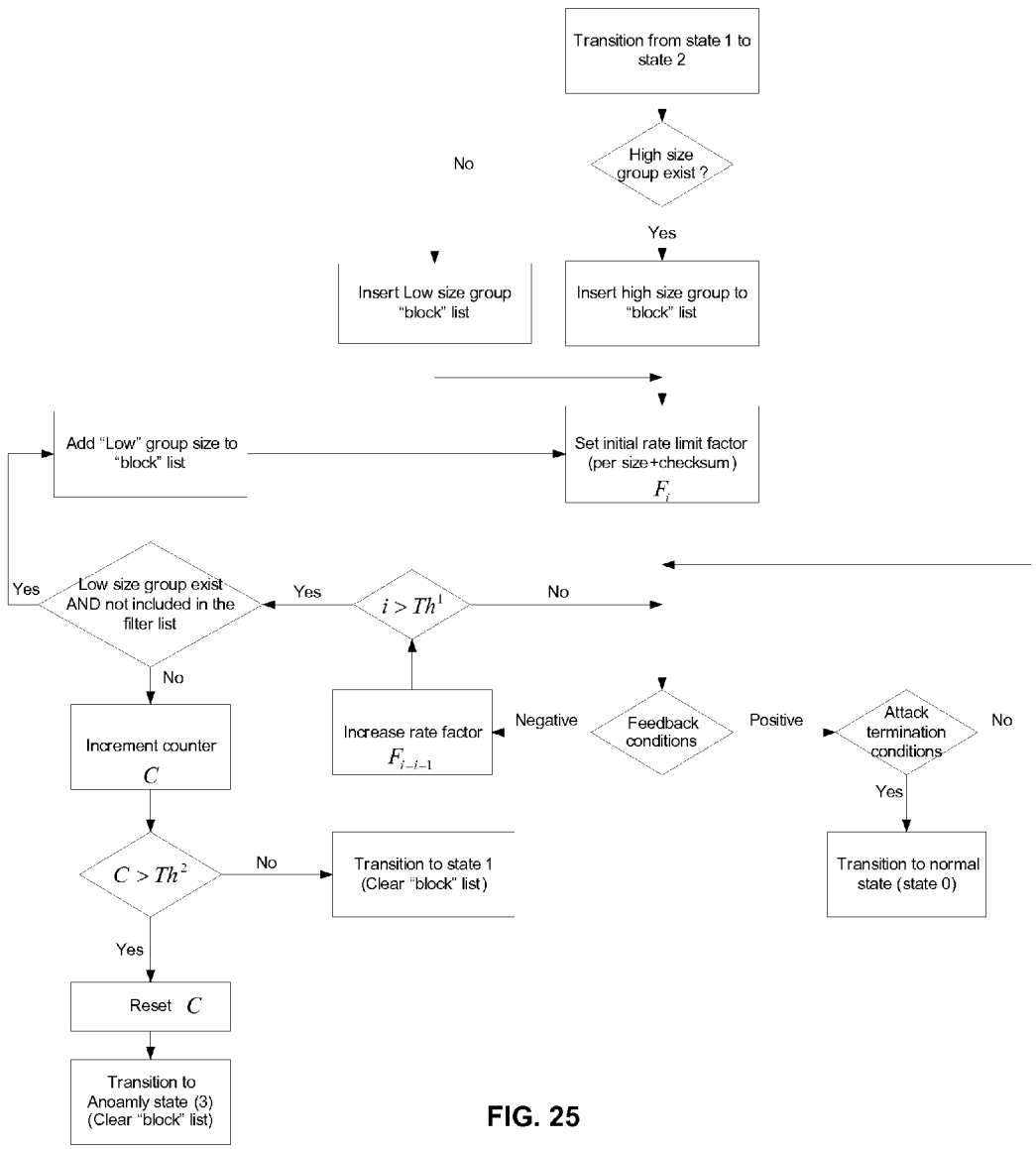
FIG. 25 illustrates a flow chart depicting the gradual size rate limit mechanism.

FIG. 25 illustrates the gradual size rate limit mechanism.

Rate-limit Factors—$F_i$ (Size Mitigation Case)

When the mitigation method is per request URL only (i.e., no suspicious sources were detected or because the number of suspicious sources restriction), a different rate limit factor applies to each specific request-URL(s). The rate limit in this case is set according to the adapted URL size probability (occurrences value E(i)), thus the attack is normalized (although the normalization might slow legitimate HTTP requests that matches the request that is used by the attack itself).

Although the normal expected occurrences value is per size grade and not a specific HTTP request-URL (i.e., the actual normal rate of the specific request can be lower), we expect that the rate limit process will be sufficient enough during attacks.

As in the case of source IP mitigation method, also here there are two options to set the rate limit factor (configurable):
 a. Automatic rate limiting
 b. Manually rate limiting—(defined later on)

Automatic Mitigation Method

In automatic mode the rate limit factor F, will be set as follow:

Initial rate limit factor—$F_1 = \overline{E}(i) \times \Delta T$, where
 $\Delta T \equiv$ Is the rate limit time unit (default: 1 sec)
 $\overline{E}(i) \equiv$ Represents the expected number of HTTP request-URL of size i (grade i).
 $\overline{E}(i)$ is the same value that was calculated in the size trap-buffer (i.e., the one that was used for setting the threshold in the first second—see Eq. 26).

The rate limit steps will be set according to Table 4 below:

TABLE 3

| Rate limit step (i) | $F_i$ | Comment |
|---|---|---|
| 1 | $F_1 = \overline{E}(i) \times \Delta T$ | Initial factor |
| 2 | $F_2 = F_1 \times 0.5$ | Set upon negative mitigation feedback indication |
| 3 | $F_3 = F_1 \times 0.1$ | $3^{rd}$ and more aggressive rate limit factor |
| 4 | $F_f = 0$ (configurable) | When 100% is set, all suspicious request-URLs will be blocked toward the protected server. |

In Table 4, $F_i$ is the rate limit factor that is associated with specific HTTP request-URL.

There are four rate limit steps that are taken place according to the feedback process. The final step $F_f$ is a full HTTP request-URL block and will only be used in case the protection system was configured to work in a "Full block" mode (not the default mode). The default $Th^1$ value is 3. In case that "Full block" mode is enabled, $Th^1$ is set to 4.

Full block mode—Last rate limit step $Th^1$ can be configured with the following values:
 a. 25% (25% http request URL traffic offload)
 b. 50%
 c. 75%
 d. 100% (default—100%, means that all suspicious request URL's are blocked towards the target HTTP server.

Mitigation Feedback Process

Mitigation positive and negative feedbacks are handled in the same way as in the case of source mitigation.

Transition Back to State 1 (Unsuccessful Mitigation)

If mitigation negative feedback is identified after that all rate limit steps where implemented, the system will remove all request-URL(s) from the block list and a transition back to state 1 will take place.

This transition will help handle cases in which the attack's characterization is changing (e.g., new HTTP request-URLs are used in the HTTP flood). After a predefined number ($Th^2$) of transitions from state 2 to 1, the system will transit to state 3 (suspect state)—This is the same behavior as in the case of source mitigation.

Attack Termination Condition (Size Mitigation Case)

Figure 26:
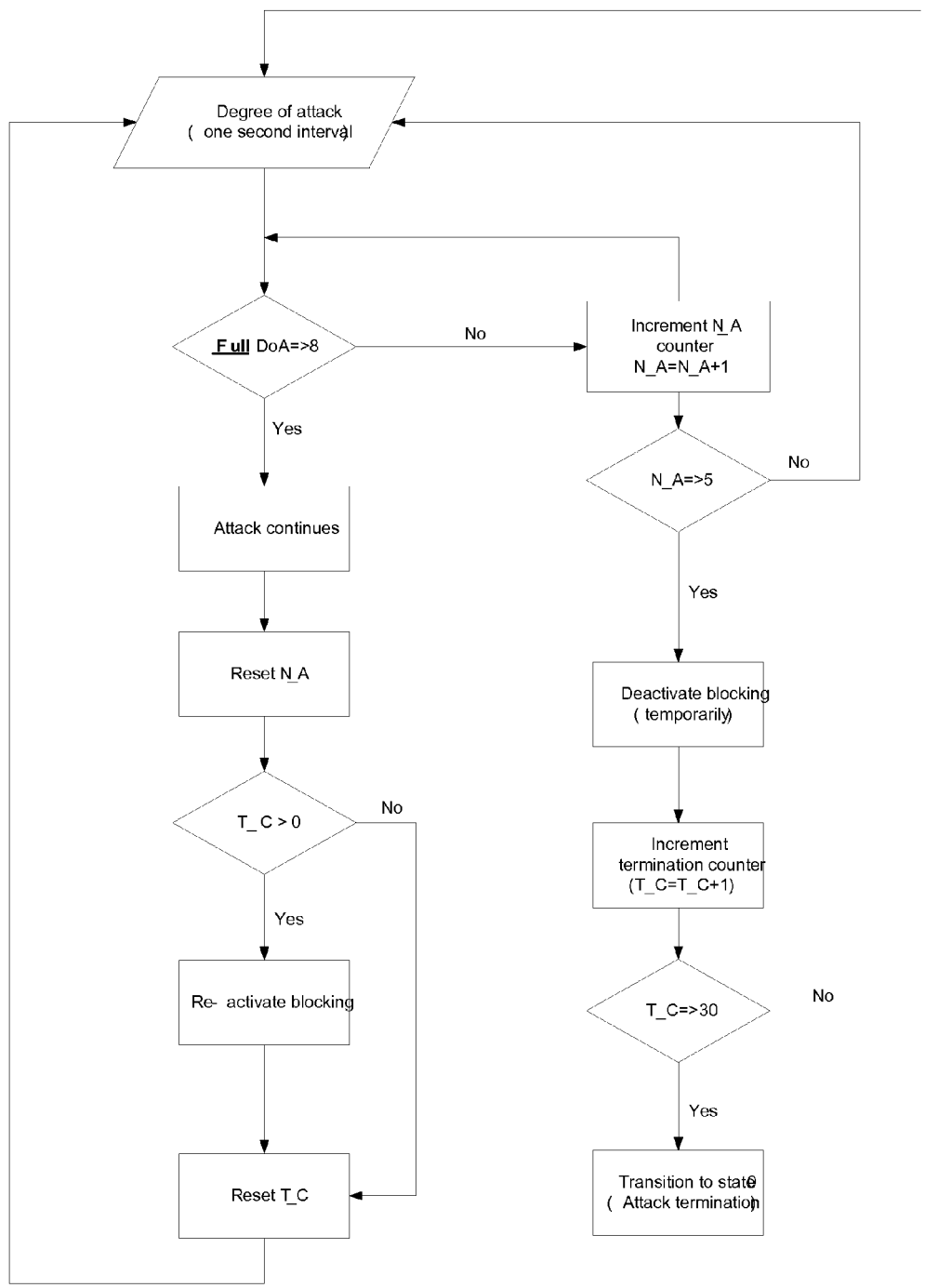
FIG. 26 illustrates a flow chart depicting the attack termination condition (size mitigation case).

FIG. 24 illustrates the end of attack condition (size mitigation case). Attack termination is identified in state 2 by FIG. 26. When the Full DoA stays, persistently, below 8, blocking will be temporarily suspended. If during this period the Full DoA is below 8, the system will transit to state 0 (i.e., attack will be terminated). The motivation behind this process is the same as for the source mitigation. In this case the low hit condition isn't relevant because TCP connections are allowed to be established (also when a full block mode is enabled).

Blocking Filter Format:

The blocking rules that were defined in the mitigation process are provided below in Table 4:

TABLE 4

| | Blocking filter options: | |
|---|---|---|
| # | Mitigation filter options | Max number of values (per system) |
| 1 | {Source IP} [IP] AND {Destination IP} [IP's] AND {destination port} [Port] AND {HTTP request type} [Get or Post] AND {Request-URI} [string(s)] | Source IP's: 5000 Checksum's per Source IP: 5 |
| 2 | {Destination IP} [IP's] AND {destination Port} [Port] AND {HTTP request type} [Get or Post] AND {Request-URI} [string(s)] | Checksum's: 1000 |
| 3 | {Destination IP} [IPs] AND {Destination Port} [Port] AND {request type} [Other: Put, Delete . . . ] | N/R |

Manual (Non-adaptive) Attack Triggers Mode

An option to configure manual triggers is implemented. Operation in this mode means that:
1. Learning mechanism doesn't influence the detection engines (i.e., no thresholds and FIS updates)
2. FIS 1 (engine 3) and FIS 2 (engine 4) are disabled (i.e., N/R for decisions)
3. Instead of decision engines 3 and 4, R_C and OutB_C triggers are implemented as simple thresholds.
4. LDT (size distribution) will not have any influence on the decision during this mode of operation.
5. Attack triggers are set according to threshold configuration. The following thresholds per protected server are need to be configured:
 a. R_C attack threshold
 b. OutB_C attack threshold
 c. Other_C attack threshold
 d. S_K_C attack threshold
 e. Con_R_C attack threshold Please note that aforementioned thresholds represent attack and not normal values.

Threshold will be ignored in case that it isn't configured, i.e., the system will not trigger an attack according to a non-configured threshold.

6. Characterization state (1)—the output of the characterization state is the mitigation method, i.e., source or size mitigation (only high source group is relevant in this state). In this mode trap-buffers cannot be activated which means that filters are not created.
7. Mitigation state (2): http rate limit is applied according to the manual mitigation settings (see 11 below).
8. No negative feedback operations exist in this operation mode, i.e., $Th^1$ is set to one.
9. Suspect state (3): same operation as in the case of adaptive decision flow
10. Attack termination conditions are the same as in the case of adaptive decision flow.
    This includes the low hit condition in case of full block
11. Manual mitigation settings:
    Source Manual Mitigation Rate Limit Mode
    In case source mitigation method is activated the following rate limit settings are relevant Possible Manual Rate Limit Factors are:
    a. 25%—offload 25% of HTTP requests that are generated by all suspicious sources
    b. 50%
    c. 75%
    d. 100%—100% means that all traffic from the suspicious sources is blocked (including syn packets).
    Size manual mitigation rate limit mode (please note that we are using the learning in any case in order to find suspect request-URL size)
    Possible manual rate limit factors are:
    a. 25%—offload 25% of the suspicious request URL's toward the attacked server
    b. 50%
    c. 75%
    d. 100%—100% means that all HTTP request URL's will be blocked toward the attacked server during the attack.
    Illustration of Decision Ranges
    R_C and OutB_C Decision Ranges FIG. 8 illustrates the normal, suspicious and attack decision ranges (edges) that are created by previously described equations 7, 8 and 9.

The second plot shows the ratio between attack edge and normal edge (810) and between attack edge and suspect edge (812).

Legend:
806—Normal edge
804—Suspect edge
808—Attack edge
802—Peaks (Legitimate peaks)

S_R_C and Con_R_C Decision Ranges

FIG. 9 illustrates the normal, suspicious and attack ranges (same representation as in FIG. 8).

Additionally, the present invention provides for an article of manufacture comprising computer readable program code contained within implementing one or more modules to implement a method providing adaptive behavioral HTTP flood protection. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

The present invention also provides for computer readable program code implementing: an interface aiding in receiving at least the following: a plurality of real-time statistical parameters or a plurality of normal base line values, said plurality of real-time statistical parameters comprising at least one rate-based parameter and rate-invariant parameter; embedded correlation rules; a degree of anomaly generator generating a degree of anomaly (DoA) based on said received plurality of real-time statistical parameters and said plurality of normal base line values; and when said generated degree of anomaly indicates a network attack, said decision engine communicates with at least one trap buffer to characterize the anomaly and then to mitigate it trough closed feedback rate-limit mechanism.

CONCLUSION

A system and method has been shown in the above embodiments for the effective implementation of an adaptive behavioral HTTP flood protection. While various preferred embodiments have been shown and described, it will be understood that there is no intent to limit the invention by such disclosure, but rather, it is intended to cover all modifications and alternate constructions falling within the spirit and scope of the invention.

The invention claimed is:

1. An anomaly detection engine for protecting a web server from hypertext transfer protocol (HTTP) flood attacks, -comprising:
    an interface to receive a plurality of real-time statistical parameters and a plurality of normal base line values, said plurality of real-time statistical parameters comprising at least one rate-based parameter, at least one rate-invariant parameter, wherein the rate-invariant parameter includes at least HTTP request URL size distribution parameters;
    an embedded correlation engine for applying embedded correlation rules on at least said received real-time statistical parameters;
    a degree of anomaly generator for generating a degree of anomaly (DoA) based on said received plurality of real-time statistical parameters, said plurality of normal base line values, deviation analysis of said real-time statistical parameters from said normal base-line values, and said embedded correlation rules;
    a decision engine for activating at least one trap buffer, when said generated degree of anomaly indicates on a HTTP flood attack, wherein said at least one trap buffer is adapted, based on normal base-line values of the URL size distribution parameters, to characterize the anomaly and create, in real time, a pattern of the anomaly; and
    a mitigation mechanism for mitigating traffic flows of HTTP flood requests, based on the generated anomaly pattern, thereby protecting said web server from said HTTP flood attacks.

2. The anomaly detection engine of claim 1, further comprising a learning mechanism for generating an adapted normal distribution baseline of universal resource locator (URL) sizes of HTTP request.

3. The anomaly detection engine of claim 1, wherein said anomaly detection engine is implemented in a network security device accessible over a network.

4. The anomaly detection engine of claim 3, wherein said network is any of, or a combination of, the following: a local area network, a wide area network, the Internet, or a cellular network.

5. The anomaly detection engine of claim 1, wherein said real-time statistical parameters further include at least one of: number of HTTP requests per second, HTTP outbound bandwidth, ratio between HTTP request to outbound HTTP bandwidth, number of HTTP request per TCP connection, and number of HTTP requests per second per source IP.

6. The anomaly detection engine of claim 1, wherein said at least one trap buffer further comprises:
at least one source IP trap buffer for detecting abnormal repetitions of HTTP requests sent toward the protected web server per source IP address; and
at least one HTTP request size trap buffer for detecting abnormal repetitions of HTTP requests sent toward the protected web server from any source IP address.

7. The anomaly detection engine of claim 1, wherein said at least one rate-based parameter is any of the following:
a get request per second counter (Get_C) being incremented by one upon classification of any HTTP Get or Post request toward a protected web server;
an other request per second counter (Other_C) being incremented by one upon classification of any HTTP request type that is not Get or Post toward a web protected server;
a post request per second counter (Post_C) being incremented by one upon classification of any HTTP Post request toward a protected server;
an outbound bandwidth counter (OutB_C), which measures the HTTP traffic that is downloaded from a protected web server;
a source HTTP request per second counter (S_R_C), which is attached to each source IP address having an active HTTP session with a protected web server, wherein the S_R_C counter is incremented by one upon classification of any HTTP Get or Post request toward the protected web server; and
a HTTP request per connection counter (Con_R_C), which is maintained per TCP connection, wherein the Con_R_C counter is incremented upon classification of any HTTP Get or Post request toward a protected web server.

8. The anomaly detection engine of claim 7, wherein said at least one rate-invariant parameter is any of the following:
a ratio between outbound bandwidth to inbound HTTP requests (Out/R_P), which measures an average of downloaded HTTP object size per HTTP Get or Post requests; and
a HTTP request short-term size distribution table (S_D_T), which measures the current size distribution of HTTP request URL's, and upon classification of a HTTP Get or Post requests, the HTTP Get or Post request URL being indexed based on its size and a respective size counter in the short-term size distribution table is incremented.

9. The anomaly detection engine of claim 8, wherein HTTP request size index in said S_D_T is calculated as follows:
Request Size Index =INT(Request Size/10), where said Request Size measures the length in bytes of a request URL path.

10. The anomaly detection engine of claim 9, wherein a measure of deviation from normal base-line Request URL Size distribution is set over a predetermined time period.

11. The anomaly detection engine of claim 2, wherein said learning mechanism maintains a long-term size distribution table (L_D_T) representing the adapted normal distribution baseline of URL sizes of HTTP requests, wherein a measure of deviation from an expected request size occurrences is set over a predetermined time period.

12. The anomaly detection engine of claim 11, wherein a set of expected values E(i) in calculated from said L_D_T as follows: $E(i)=P(i) \times R\_C_n$, where $R\_C_n$ is the total number of HTTP request (Post and Get) in one second and P(i) is the probability of each URL size grade.

13. The anomaly detection engine of claim 1, wherein mitigating the traffic flows of HTTP flood requests further comprising performing at least one of:
rate limiting traffic flows which are defined by both Source IP(s) and associated HTTP request URL, represented by a checksum-, towards said protected web server;
rate limiting traffic flows which are defined only by HTTP request URL checksum(s) toward said protected web server; and
blocking source IP(s) toward said protected web server,
wherein a rate limit factor utilized to rate limit the traffic flows is set according to adapted HTTP request URL size distribution (E(i)).

14. The anomaly detection engine of claim 13, wherein the rate limit factor is dynamically set according to any of the following closed feedback loop operations:
periodically generating a first DoA value according to all inbound traffic parameters of traffic sent toward the protected web server prior to mitigation and generating a second DoA value according to remaining filtered traffic after mitigation; and
increasing the rate-limit factor until the second DoA value reaches low value which represents a successful mitigation of the HTTP flood requests.

* * * * *